US012243478B2

(12) United States Patent
Seo et al.

(10) Patent No.: US 12,243,478 B2
(45) Date of Patent: Mar. 4, 2025

(54) DISPLAY DEVICE

(71) Applicant: Samsung Display Co., Ltd., Yongin-Si (KR)

(72) Inventors: Hae-Kwan Seo, Hwaseong-si (KR); Bonghyun You, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 24 days.

(21) Appl. No.: 17/405,400

(22) Filed: Aug. 18, 2021

(65) Prior Publication Data

US 2022/0148503 A1 May 12, 2022

(30) Foreign Application Priority Data

Nov. 11, 2020 (KR) ........................ 10-2020-0150366

(51) Int. Cl.
*G09G 3/3283* (2016.01)
*G09G 3/3233* (2016.01)
*G09G 3/3266* (2016.01)

(52) U.S. Cl.
CPC ......... *G09G 3/3233* (2013.01); *G09G 3/3266* (2013.01); *G09G 3/3283* (2013.01); *G09G 2310/08* (2013.01); *G09G 2320/043* (2013.01); *G09G 2320/0686* (2013.01); *G09G 2330/021* (2013.01)

(58) Field of Classification Search
CPC .. G09G 3/3233; G09G 3/3266; G09G 3/3283; G09G 2310/08; G09G 2320/043; G09G 2320/0686; G09G 2330/021
USPC ........................................................... 345/214
See application file for complete search history.

(56) References Cited

U.S. PATENT DOCUMENTS

| | | | | |
|---|---|---|---|---|
| 10,332,467 | B2 | 6/2019 | Lee et al. | |
| 2019/0206329 | A1 * | 7/2019 | Lee | G09G 3/3677 |
| 2021/0110774 | A1 | 4/2021 | Cho et al. | |
| 2021/0407352 | A1 | 12/2021 | Seo et al. | |
| 2021/0407429 | A1 | 12/2021 | Seo et al. | |

(Continued)

FOREIGN PATENT DOCUMENTS

| | | | |
|---|---|---|---|
| EP | 0573822 | B1 | 4/1997 |
| KR | 20150106372 | A | 9/2015 |
| KR | 20170024106 | A | 3/2017 |

(Continued)

*Primary Examiner* — Amare Mengistu
*Assistant Examiner* — Gloryvid Figueroa-Gibson
(74) *Attorney, Agent, or Firm* — CANTOR COLBURN LLP

(57) ABSTRACT

A display device includes a display panel including a plurality of pixels respectively connected to corresponding data lines and respectively connected to corresponding scan lines, a data driving circuit for driving the corresponding data lines, a scan driving circuit for driving the corresponding scan lines, and a driving controller for, during a multi-frequency mode, dividing the display panel into a first display area and a second display area and controlling the data driving circuit and the scan driving circuit so that the first display area is driven at a first driving frequency, and the second display area is driven at a second driving frequency lower than the first driving frequency. During the multi-frequency mode, the driving controller divides the second display area into a plurality of blocks and alternately drives the plurality of blocks every frame.

19 Claims, 25 Drawing Sheets

(56) References Cited

U.S. PATENT DOCUMENTS

| | | | | |
|---|---|---|---|---|
| 2021/0407430 | A1 | 12/2021 | Seo et al. | |
| 2022/0180782 | A1* | 6/2022 | Nishio | G02F 1/133 |

FOREIGN PATENT DOCUMENTS

| | | | |
|---|---|---|---|
| KR | 1020190083393 | A | 7/2019 |
| KR | 1020210043773 | A | 4/2021 |
| KR | 1020220000022 | A | 1/2022 |
| KR | 1020220001555 | A | 1/2022 |
| KR | 1020220002776 | A | 1/2022 |
| WO | 2016022265 | A1 | 2/2016 |

* cited by examiner

DISPLAY DEVICE

This application claims priority to Korean Patent Application No. 10-2020-0150366, filed on Nov. 11, 2020, and all the benefits accruing therefrom under 35 U.S.C. § 119, the content of which in its entirety is herein incorporated by reference.

BACKGROUND

1. Field

Embodiments of the invention herein relate to a display device.

2. Description of the Related Art

An organic light emitting display device among display devices displays an image using an organic light emitting diode that generates light by recombination of electrons and holes. Such an organic light emitting display device has an advantage of having a high response speed and being driven at low power consumption.

The organic light emitting display device includes pixels connected to data lines and scan lines. Each of the pixels generally includes an organic light emitting diode and a circuit unit for controlling an amount of current flowing through the organic light emitting diode. The circuit unit controls, in response to a data signal, the amount of current flowing from a first driving voltage source to a second driving voltage source via the organic light emitting diode. In this case, light of a predetermined luminance is generated in response to the amount of current flowing through the organic light emitting diode.

As fields of use of a display device are being diversified, a plurality of images different from each other may be simultaneously displayed on one display device.

SUMMARY

For a display device that simultaneously displays a plurality of images, a technology preventing degradation of display quality while reducing power consumption is desired.

Embodiments of the invention provide a display device capable of reducing power consumption and preventing degradation of display quality and a driving method thereof.

An embodiment of the invention provides a display device including a display panel including a plurality of pixels respectively connected to corresponding data lines of a plurality of data lines and respectively connected to corresponding scan lines of a plurality of scan lines, a data driving circuit which drives the plurality of data lines, a scan driving circuit which drives the plurality of scan lines, and a driving controller divides the display panel into a first display area and a second display area and to control the data driving circuit and the scan driving circuit so that the first display area is driven at a first driving frequency, and the second display area is driven at a second driving frequency lower than the first driving frequency, where, during the multi-frequency mode, the driving controller divides the second display area into a plurality of blocks and drives a block of the plurality of blocks every frame during a multi-frequency mode.

In an embodiment, consecutive frames of the multi-frequency mode may have a same duration as each other.

In an embodiment, the driving controller may control, in a normal mode, the data driving circuit and the scan driving circuit so that the first display area and the second display area are driven at a normal frequency, where the second driving frequency is lower than the normal frequency.

In an embodiment, the first driving frequency may be higher than the normal frequency.

In an embodiment, the driving controller may alternately drive the plurality of blocks of the second display area every frame during the multi-frequency mode.

In an embodiment, the scan driving circuit may include a plurality of driving stages, and a driving stage of the plurality of driving stages may drive a first scan line among the plurality of scan lines.

In an embodiment, the driving stage of the plurality of driving stages may include a first output terminal connected to the first scan line, a second output terminal which outputs a carry signal, a driving circuit which determines a level of a signal of each of a first node and a second node in response to clock signals and a previous carry signal, and a masking circuit which outputs a first scan signal to the first output terminal in response to the signal of the first node, the signal of the second node, and the masking clock signal, where the first node is electrically connected to the second output terminal, and the previous carry signal is the carry signal outputted from a previous driving stage.

In an embodiment, the driving controller, may drive only a first block among the plurality of blocks during a first frame. The driving controller may drive only a second block among the plurality of blocks during a second frame consecutive to the first frame.

In an embodiment, the first frame and the second frame may have a same duration as each other.

In an embodiment, the masking clock signal may indicate a driving/non-driving state of each of the plurality of blocks of the second display area.

In an embodiment, each of driving stages corresponding to the first block among the plurality of driving stages may mask the first scan signal during the second frame.

In an embodiment, the driving controller may set a frequency of the clock signals to a frequency higher than a normal frequency when driving stages corresponding to the first block are driven during the second frame.

In an embodiment, the driving stage of the plurality of driving stages may further include a first voltage terminal which receives a first voltage and a second voltage terminal receives a second voltage, where the masking circuit includes a first masking transistor which is connected between the second voltage terminal and the first output terminal and includes a gate electrode connected to the second node, and a second masking transistor which is connected between the first output terminal and an input terminal receiving the masking clock signal and includes a gate electrode connected to the first node.

In an embodiment, the scan driving circuit may include a plurality of driving stages, and a driving stage of the plurality of driving stages may drive a first scan line and a second scan line among the plurality of scan lines.

In an embodiment, the driving stage of the plurality of driving stages may include a first output terminal connected to the first scan line, a second output terminal connected to the second scan line, a driving circuit outputs a second scan signal to the second output terminal in response to clock signals and a previous carry signal, a first masking circuit which outputs a first scan signal outputted to the first output terminal at a predetermined level in response to a first masking signal, and a second masking circuit which electrically connects the first output terminal and the second output terminal in response to a second masking signal to output the second scan signal as the first scan signal, where the previous carry signal is the second scan signal outputted from a previous driving stage among the plurality of driving stages.

In an embodiment, the driving controller may drive only a first block among the plurality of blocks during a first frame. The driving controller may drive only a second block among the plurality of blocks during a second frame consecutive to the first frame.

In an embodiment, the first masking signal and the second masking signal may indicate a driving/non-driving state of each of the plurality of blocks of the second display area.

In an embodiment, each of driving stages corresponding to the first block among the plurality of driving stages may mask the first scan signal during the second frame.

In an embodiment, during the multi-frequency mode, an image signal provided to the first display area may be a moving image signal, and an image signal provided to the second display area may be a still image signal.

In an embodiment of the invention, a display device includes a display panel including a plurality of pixels respectively connected to corresponding data lines of a plurality of data lines and respectively connected to corresponding scan lines of a plurality of scan lines, a data driving circuit which drives the plurality of data lines, a scan driving circuit which drives the plurality of scan lines, and a driving controller which determines an operation mode based on an input signal and to control the data driving circuit and the scan driving circuit so that, while the operation mode is a multi-frequency mode, a first display area of the display panel is driven at a first driving frequency, and a second display area of the display panel is driven at a second driving frequency, where the driving controller outputs a masking clock signal, and the scan driving circuit, during the multi-frequency mode, drives a first portion of the second display area and does not drive a second portion of the second display area in response to the masking clock signal.

In an embodiment, a first non-folding area, a folding area, and a second non-folding area may be defined in the display panel in a plan view, where the first non-folding area corresponds to the first display area, the second non-folding area corresponds to the second display area, a first portion of the folding area corresponds to the first display area, and a second portion of the folding area corresponds to the second display area.

In an embodiment, consecutive frames of the multi-frequency mode may have a same duration as each other.

In an embodiment, during the multi-frequency mode, the driving controller may divide the second display area into a plurality of blocks, may output the masking clock signal to drive a block corresponding to the first portion among the plurality of blocks and may not drive at least one block corresponding to the second portion among the plurality of blocks.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to describe principles of the invention. In the drawings.

DETAILED DESCRIPTION

Figure 1:
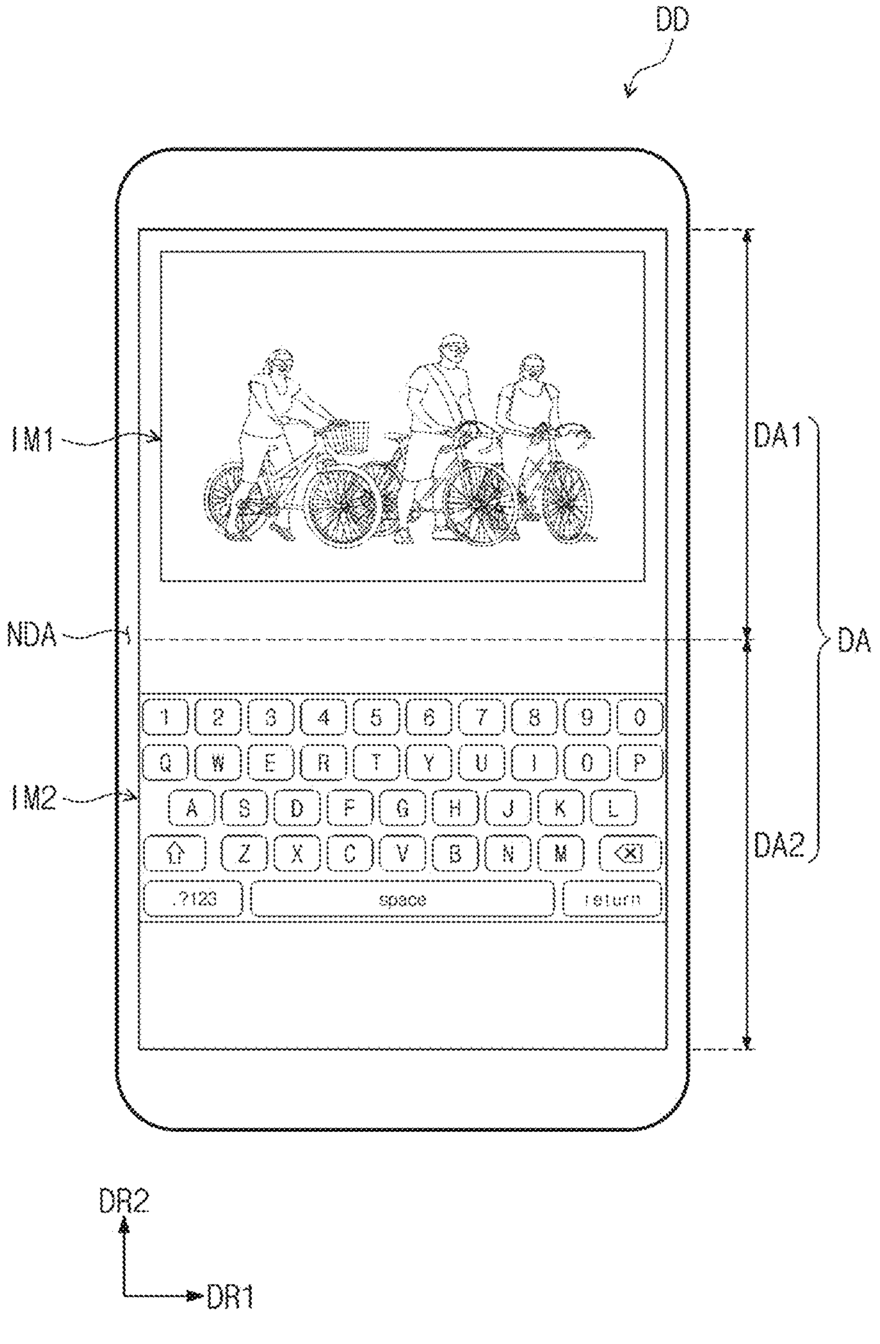
FIG. 1 is a perspective view of an embodiment of a display device according to the invention.

It will be understood that when an element or layer is referred to as being "on", "connected to" or "coupled to" another element or layer, it can be directly on, connected or coupled to the other element or layer, or intervening elements or layers may be present.

Like reference numerals refer to like elements throughout this specification. In the drawing figures, the thicknesses, ratios and dimensions of elements are exaggerated for effective description of the technical contents. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention. As used herein, the singular forms, "a", "an" and "the" are intended to include the plural forms as well, unless the context clearly indicates otherwise.

Spatially relative terms, such as "beneath", "below", "lower", "above", and "upper", may be used herein for ease of description to describe one element or feature's relationship to another element(s) or feature(s) as illustrated in the drawing figures. It will be understood that the spatially relative terms are intended to encompass different orientations of the device in use or operation in addition to the orientation depicted in the drawing figures.

It will be further understood that the terms "include" or "have", when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within +30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. Terms such as "unit" may refer to a circuit or processor, for example.

Hereinafter, the invention will be explained in detail with reference to the accompanying drawings.

FIG. 1 is a perspective view of an embodiment of a display device according to the invention.

FIG. 1 illustrates a portable terminal as an embodiment of a display device DD according to the invention. A portable terminal may include a tablet personal computer ("PC"), a smartphone, a personal digital assistant ("PDA"), a portable multimedia player ("PMP"), a game machine, a wrist watch type electronic device, or the like. However, the invention is not limited thereto. An embodiment of the invention may be used in large-sized electronic apparatuses such as a television and an outdoor digital signage, and in small- and medium-sized electronic apparatuses such as a PC, a laptop computer, a kiosk, a car navigation device, and a camera. These are merely embodiments, and it goes without saying that an embodiment of the invention may also be employed in other electronic devices as long as the embodiment does not depart from the invention.

As illustrated in FIG. 1, a display surface on which a first image IM1 and a second image IM2 are displayed is parallel to a plane defined by a first direction DR1 and a second direction DR2. The display device DD includes a plurality of areas divided on the display surface. The display surface includes a display area DA in which the first image IM1 and the second image IM2 are displayed, and a non-display area NDA adjacent to the display area DA. The non-display area NDA may be also referred to as a bezel area. In an embodiment, the display area DA may be in a quadrangular shape. The non-display area NDA surrounds the display area DA. Although not illustrated, a partially curved shape, as an example, may be included in the display device DD. As a result, the display area DA may have a curved shape.

The display area DA of the display device DD includes a first display area DA1 and a second display area DA2. In a predetermined application program, the first image IM1 may be displayed in the first display area DA1, and the second image IM2 may be displayed in the second display area DA2. In an embodiment, the first image IM1 may be a moving image, and the second image IM2 may be a still image or text information having a long change period, for example.

The display device DD in an embodiment may drive, at a normal frequency, the first display area DA1 in which a moving image is displayed and may drive, at a low frequency lower than the normal frequency, the second display area DA2 in which a still image is displayed. The display device DD may reduce power consumption by lowering a driving frequency of the second display area DA2.

The size of each of the first display area DA1 and the second display area DA2 may be preset and may be changed by an application program. In an embodiment, when the first display area DA1 displays a still image, and the second display area DA2 displays a moving image, the first display area DA1 may be driven at the low frequency, and the second display area DA2 may be driven at the normal frequency. In addition, the display area DA may be divided into three or more display areas, and a driving frequency of each of the display areas may be determined according to the type of an image (e.g., a still image or a moving image) displayed in a corresponding one of the display areas.

Figure 2A:
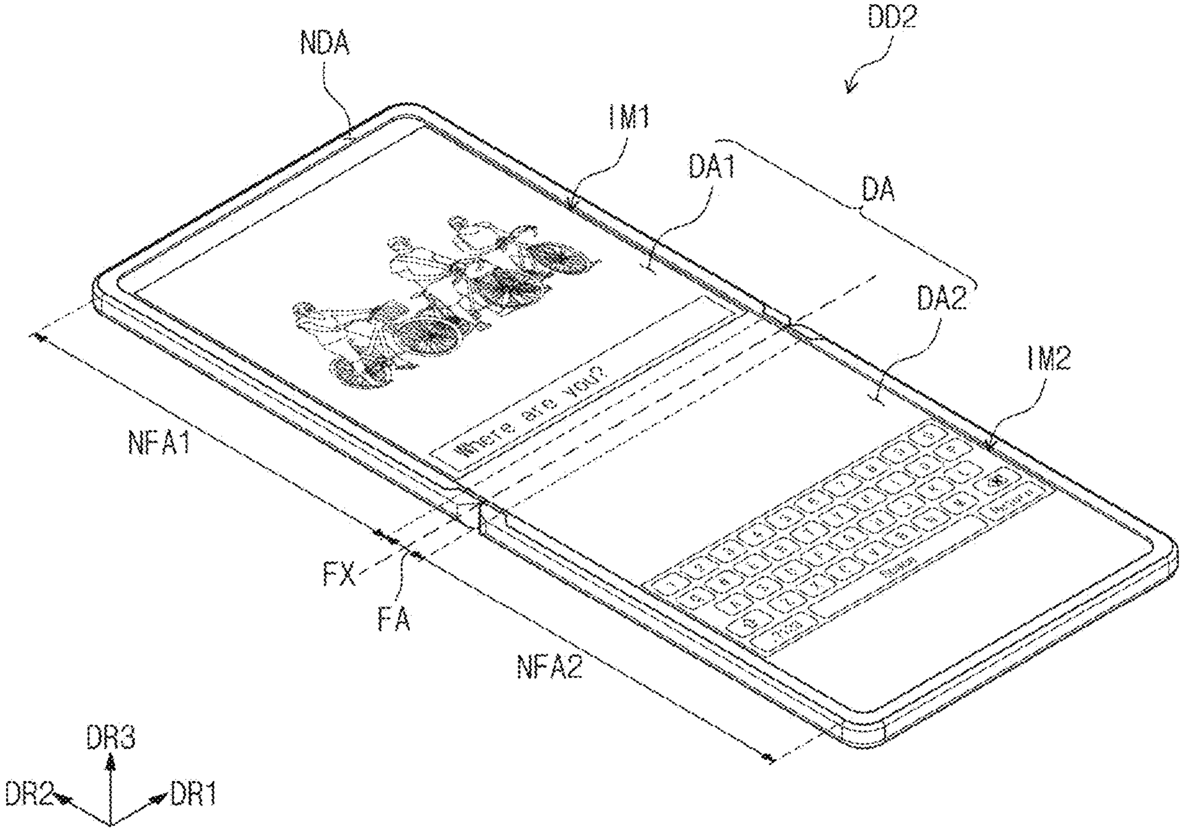
FIG. 2A and FIG. 2B are perspective views of an embodiment of a display device according to the invention.
Figure 2B:
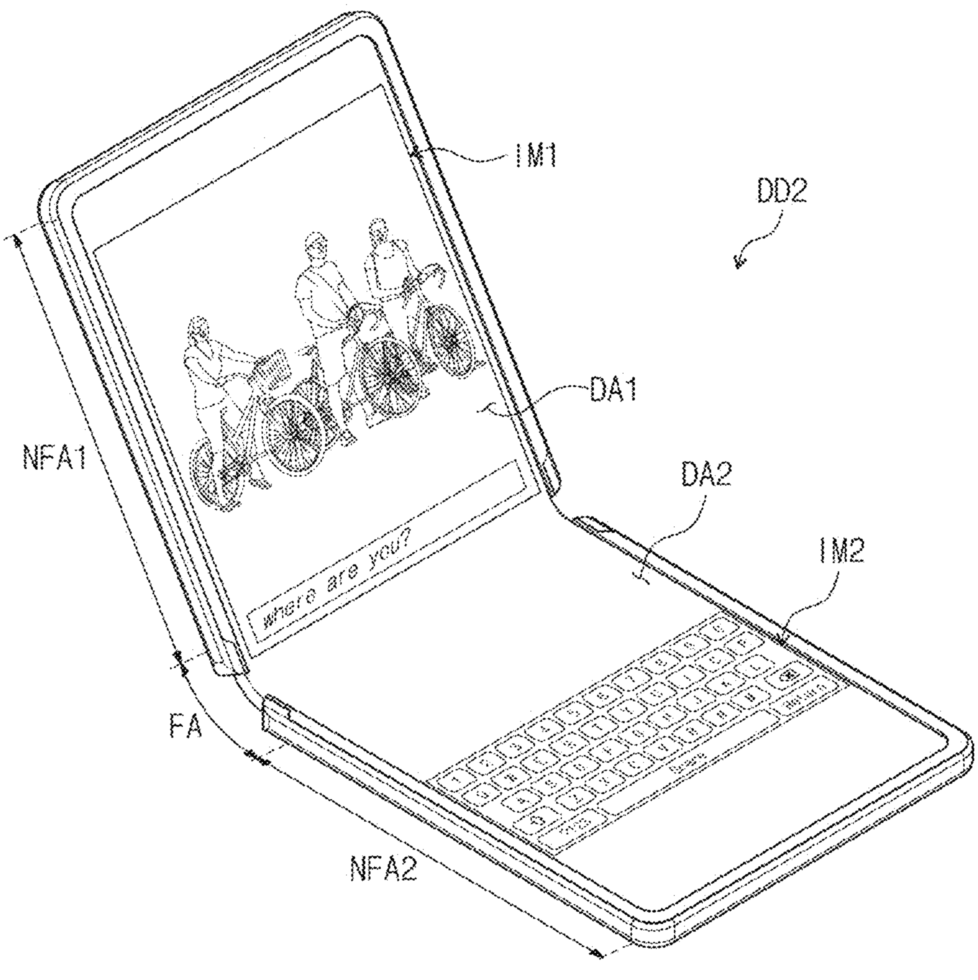

FIG. 2A and FIG. 2B are perspective views of a display device DD2 according to the invention. FIG. 2A illustrates a state in which the display device DD2 is unfolded, and FIG. 2B illustrates a state in which the display device DD2 is folded.

As illustrated in FIG. 2A and FIG. 2B, the display device DD2 includes a display area DA and a non-display area NDA. The display device DD2 may display an image through the display area DA. When the display device DD2 is unfolded, the display area DA may include a plane defined by a first direction DR1 and a second direction DR2. A thickness direction of the display device DD2 may be parallel to a third direction DR3 crossing the first direction DR1 and the second direction DR2. Accordingly, a front surface (or a top surface) and a rear surface (or a bottom surface) of each of members constituting the display device DD2 may be defined based on the third direction DR3. The non-display area NDA may be also referred to as a bezel area. In an embodiment, the display area DA may be in a quadrangular shape. The non-display area NDA surrounds the display area DA.

The display area DA may include a first non-folding area NFA1, a folding area FA, and a second non-folding area NFA2. The folding area FA may be bent about a folding axis FX extending in the first direction DR1.

When the display device DD2 is folded, the first non-folding area NFA1 and the second non-folding area NFA2 may face each other. Accordingly, in a fully folded state, the display area DA may not be exposed to the outside, which may be referred to as in-folding. However, the operation of the display device DD2 is not limited thereto.

In an embodiment of the invention, the first non-folding area NFA1 and the second non-folding area NFA2 may be opposing each other when the display device DD2 is folded, for example. Accordingly, in a folded state, the first non-folding area NFA1 may be exposed to the outside, which may be referred to as out-folding.

The display device DD2 may perform only one of in-folding and out-folding operations. In an alternative embodiment, the display device DD2 may perform both the in-folding and out-folding operations. In this case, the same area of the display device DD2, for example, the folding area FA may be in-folded and out-folded. In an alternative embodiment, a partial area of the display device DD2 may be in-folded, and another partial area may be out-folded.

Although one folding area and two non-folding areas are illustrated as an example in FIG. 2A and FIG. 2B, the number of each of folding areas and non-folding areas is not limited thereto. In an embodiment, the display device DD2 may include three or more non-folding areas and a plurality of folding areas respectively disposed between adjacent non-folding areas, for example.

Although FIG. 2A and FIG. 2B illustrate a case that the folding axis FX is parallel to a short axis of the display device DD2, the invention is not limited thereto. In an embodiment, the folding axis FX may extend along a long axis of the display device DD2, e.g., in a direction parallel to the second direction DR2, for example. In this case, the first non-folding area NFA1, the folding area FA, and the second non-folding area NFA2 may be sequentially arranged in the first direction DR1.

A plurality of display areas DA1 and DA2 may be defined in the display area DA of the display device DD2. The two display areas DA1 and DA2 are illustrated in FIG. 2A, but the number of the plurality of display areas DA1 and DA2 is not limited thereto.

The plurality of display areas DA1 and DA2 may include a first display area DA1 and a second display area DA2. In an embodiment, the first display area DA1 may be an area in which a first image IM1 is displayed, and the second display area DA2 may be an area in which a second image IM2 is displayed, for example, but an embodiment of the invention is not limited thereto. In an embodiment, the first image IM1 may be a moving image, and the second image IM2 may be a still image or an image (e.g., text information) having a long change period, for example.

The display device DD2 in an embodiment may operate differently according to an operation mode. The operation mode may include a normal mode and a multi-frequency mode. The display device DD2 may drive both the first display area DA1 and the second display area DA2 at a normal frequency during the normal mode. During the multi-frequency mode, the display device DD2 in an embodiment may drive, at a first driving frequency, the first display area DA1 in which the first image IM1 is displayed and may drive, at a second driving frequency lower than the normal frequency, the second display area DA2 in which the second image IM2 is displayed. In an embodiment, the first driving frequency may be equal to the normal frequency.

The size of each of the first display area DA1 and the second display area DA2 may be preset and may be changed by an application program. In an embodiment, the first display area DA1 may correspond to the first non-folding area NFA1, and the second display area DA2 may correspond to the second non-folding area NFA2. In addition, a first portion of the folding area FA may correspond to the first display area DA1, and a second portion of the folding area FA may correspond to the second display area DA2.

In an embodiment, the entirety of the folding area FA may correspond to only one of the first display area DA1 and the second display area DA2.

In an embodiment, the first display area DA1 may correspond to a first portion of the first non-folding area NFA1, and the second display area DA2 may correspond to a second portion of the first non-folding area NFA1, the folding area FA, and the second non-folding area NFA2. Accordingly, the surface area of the first display area DA1 may be smaller than the surface area of the second display area DA2.

In an embodiment, the first display area DA1 may correspond to the first non-folding area NFA1, the folding area FA, and a first portion of the second non-folding area NFA2, and the second display area DA2 may correspond to a second portion of the second non-folding area NFA2. Accordingly, the surface area of the second display area DA2 may be smaller than the surface area of the first display area DA1.

As illustrated in FIG. 2B, when the folding area FA is folded, the first display area DA1 may correspond to the first non-folding area NFA1, and the second display area DA2 may correspond to the folding area FA and the second non-folding area NFA2.

Although FIG. 2A and FIG. 2B illustrate the display device DD2 having one folding area in an embodiment of the display device, the invention is not limited thereto. In another embodiment of the invention, a display device may have two or more folding areas, a rollable display device, a slidable display device, or the like, for example.

Although, hereinafter, the display device DD illustrated in FIG. 1 is described as an example, the description about the display device DD may be equally applied to the display device DD2 illustrated in FIG. 2A and FIG. 2B.

Figure 3A:
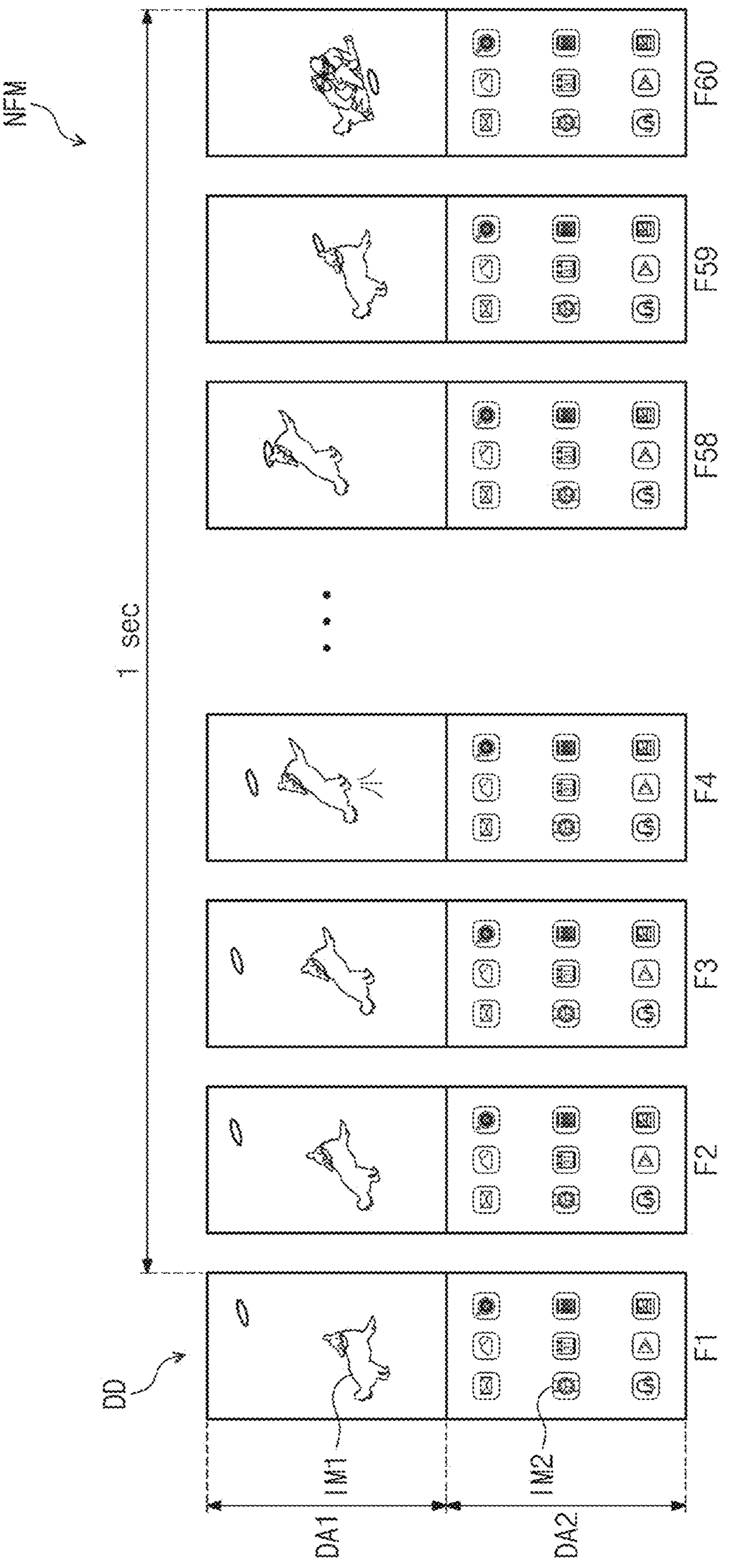
FIG. 3A is a view for describing an operation of a display device in a normal mode.
Figure 3B:
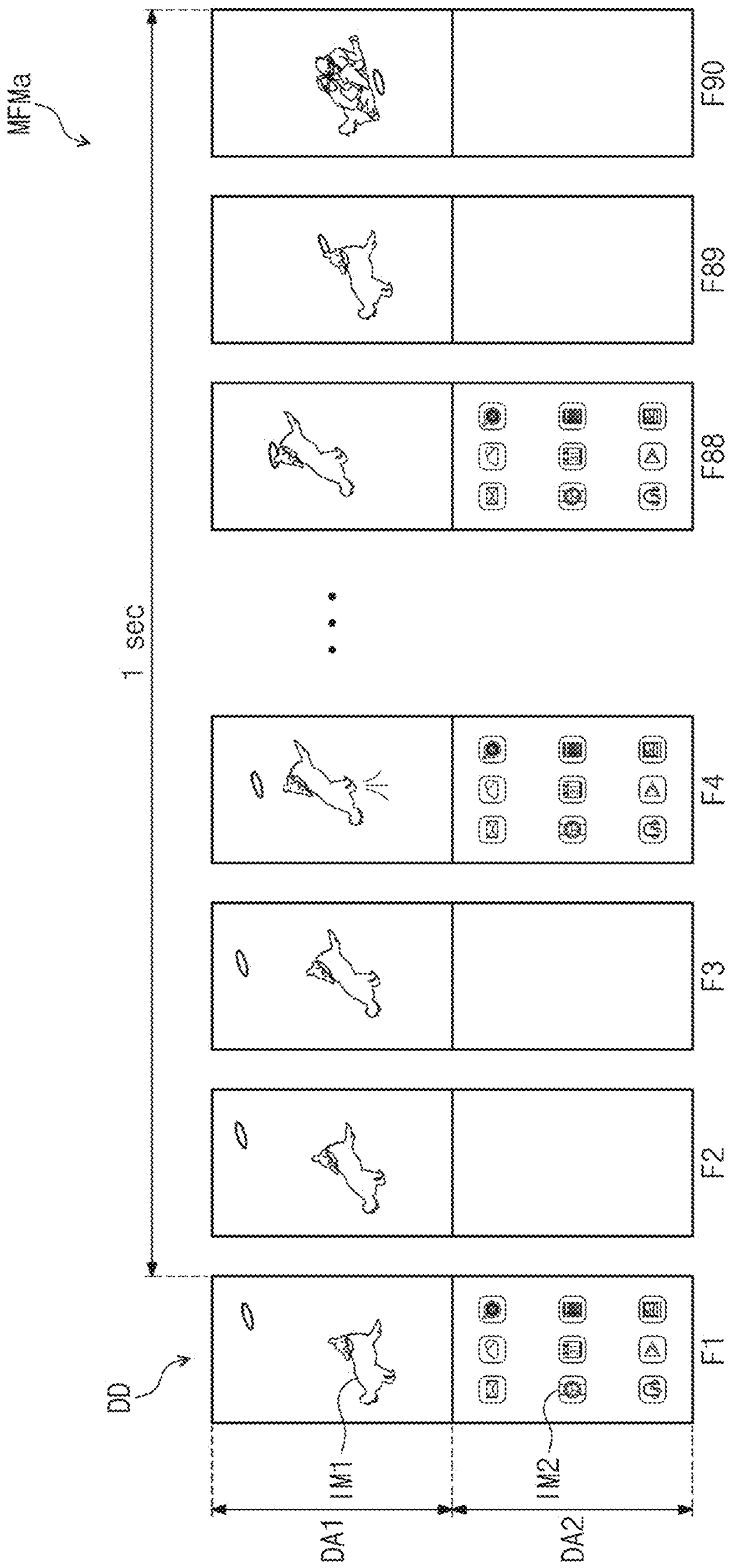
FIG. 3B and FIG. 3C are each a view for describing an operation of a display device in a multi-frequency mode.
Figure 3C:
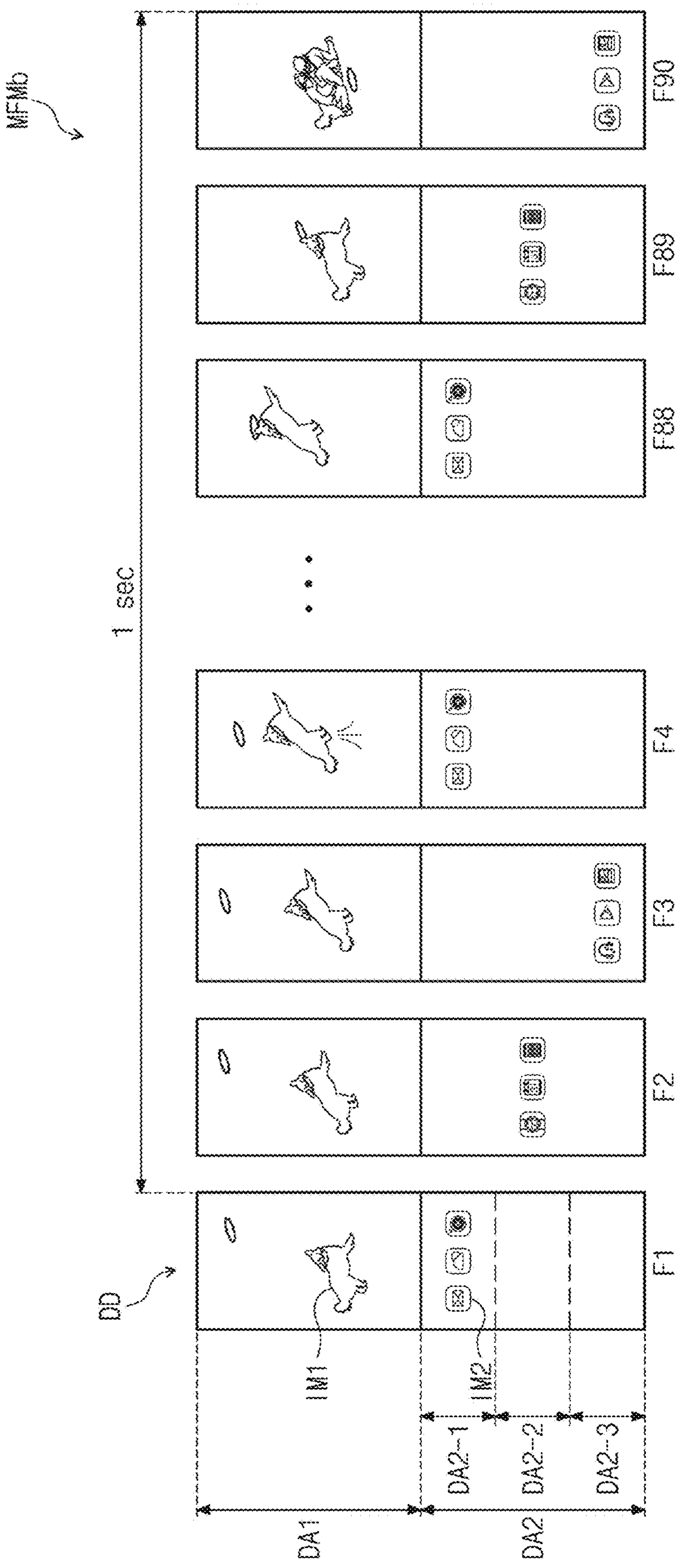

FIG. 3A is a view for describing an operation of a display device in a normal mode. FIG. 3B and FIG. 3C are each a view for describing an operation of a display device in a multi-frequency mode.

Referring to FIG. 3A, the first image IM1 displayed in the first display area DA1 may be a moving image, and the second image IM2 displayed in the second display area DA2 may be a still image or an image (e.g., an icon image) having a long change period. The first image IM1 displayed in the first display area DA1 and the second image IM2 displayed in the second display area DA2 which are illustrated in FIG. 1 are only an example, and various images may be displayed on the display device DD.

In a normal mode NFM, a driving frequency of each of the first display area DA1 and the second display area DA2 of the display device DD is the normal frequency. In an embodiment, the normal frequency may be about 60 hertz (Hz). In the normal mode NFM, for about one second, images of a first frame F1 to a 60th frame F60 (refer to FIG. 10) may be displayed in the first display area DA1 and the second display area DA2 of the display device DD, for example.

Referring to FIG. 3B, in a multi-frequency mode MFMa, the display device DD may set, to a first driving frequency, the driving frequency of the first display area DA1 in which the first image IM1, i.e., a moving image, is displayed, and may set, to a second driving frequency lower than the first driving frequency, the driving frequency of the second display area DA2 in which the second image IM2, i.e., a still image, is displayed. In an embodiment, when the normal frequency is about 60 Hz, the first driving frequency may be about 90 Hz, and the second driving frequency may be about 30 Hz, for example. The first driving frequency and the second driving frequency may be variously changed. In an embodiment, the first driving frequency may be a frequency higher than the normal frequency (e.g., about 100 Hz, about 144 Hz, etc.), and the second driving frequency may be a frequency lower than the normal frequency (e.g., about 30 Hz, about 10 Hz, about 1 Hz, etc.), for example. In another embodiment, a first driving frequency may be equal to a normal frequency, and a second driving frequency may be a frequency lower than the normal frequency (e.g., about 30 Hz, about 10 Hz, about 1 Hz, etc.).

For about one second when the first driving frequency is about 90 Hz, and the second driving frequency is about 30 Hz in the multi-frequency mode MFMa, the first image IM1 is displayed in each of first to 90th frames F1 to F90 in the first display area DA1 of the display device DD. In the second display area DA2, the second image IM2 is displayed every three frames, that is, only in the frames F1, F4, F7, . . . , and F88, and the image may not be displayed in the remaining frames F2, F3, F5, F6, . . . , F89, and F90.

In a multi-frequency mode MFMb illustrated in FIG. 3C, in the same manner as in the multi-frequency mode MFMa illustrated in FIG. 3B, the display device DD sets, to a first driving frequency, the driving frequency of the first display area DA1 in which the first image IM1, i.e., a moving image, is displayed, and sets, to a second driving frequency lower than the first driving frequency, the driving frequency of the second display area DA2 in which the second image IM2, i.e., a still image, is displayed.

In the multi-frequency mode MFMb illustrated in FIG. 3C, the display device DD may divide the second display area DA2 into first to third blocks DA2-1, DA2-2, and DA2-3, and may drive the first to third blocks DA2-1, DA2-2, and DA2-3 alternately and sequentially.

In each of (3*a*+1)-th frames F1, F4, . . . , and F88, for example, the display device DD displays an image in the first block DA2-1 of the second display area DA2 and does not display an image in the second block DA2-2 and the third block DA2-3. Here, a may be an integer equal to or greater than 0 and equal to or less than 29.

In each of (3*a*+2)-th frames F2, F5, . . . , and F89, the display device DD displays an image in the second block DA2-2 of the second display area DA2 and does not display an image in the first block DA2-1 and the third block DA2-3.

In each of (3*a*+3)-th frames F3, F6, . . . , and F90, the display device DD displays an image in the third block DA2-3 of the second display area DA2 and does not display an image in the first block DA2-1 and the second block DA2-2.

That is, because the second image IM2 for the entirety of the second display area DA2 may be displayed during three frames, for example, first to third frames F1, F2, and F3, the second driving frequency of the second display area DA2 may be about 30 Hz.

The operation of the display device DD in the multi-frequency mode MFMb will be described in detail later.

Figure 4:
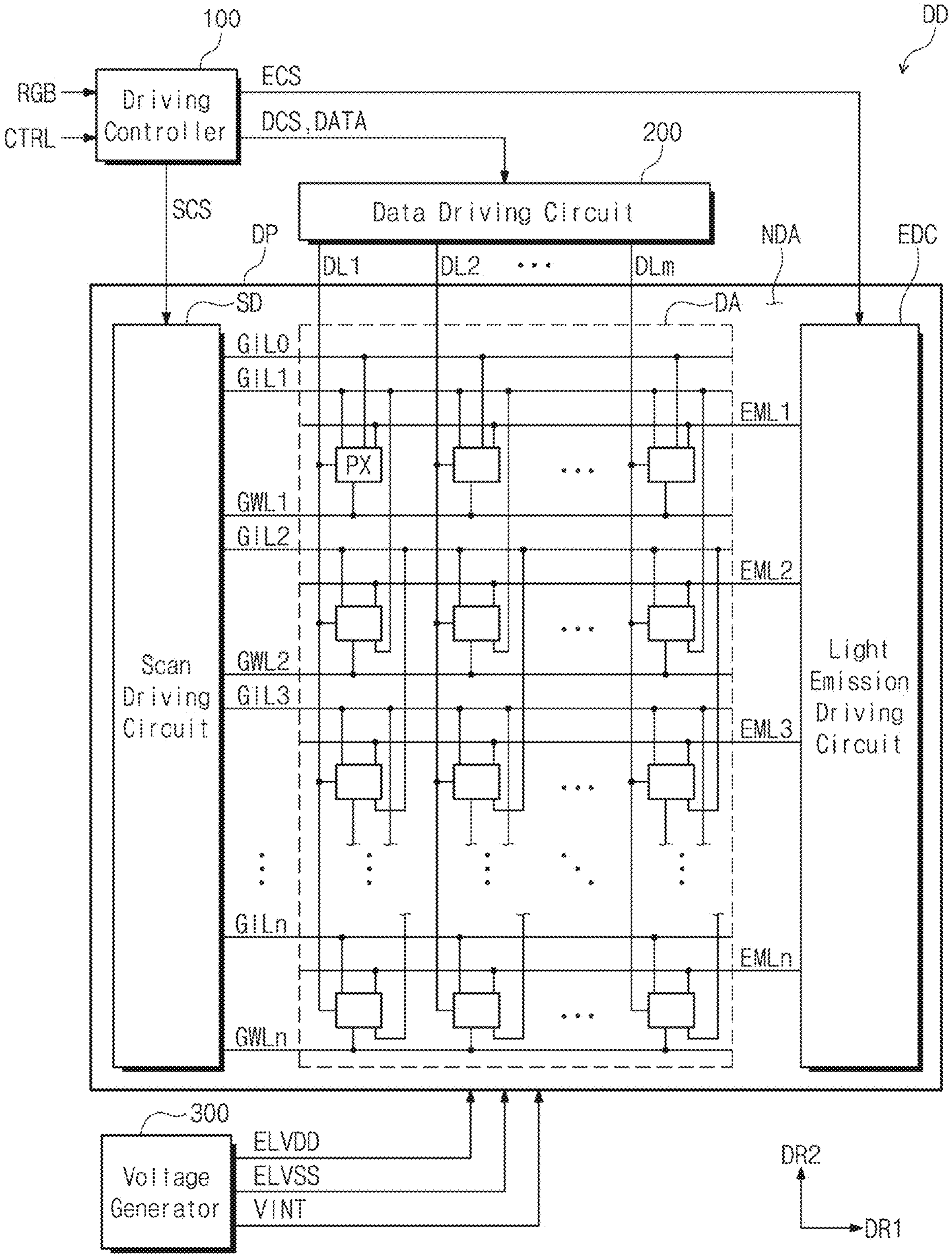
FIG. 4 is a block diagram of an embodiment of a display device according to the invention.

FIG. 4 is a block diagram of an embodiment of a display device according to the invention.

Referring to FIG. 4, the display device DD includes a display panel DP, a driving controller 100, a data driving circuit 200, and a voltage generator 300.

The driving controller 100 receives an image input signal RGB and a control signal CTRL. The driving controller 100 generates an image data signal DATA obtained by converting the data format of the image input signal RGB according to an interface specification with the data driving circuit 200. The driving controller 100 outputs a scan control signal SCS and a data control signal DCS. The data driving circuit 200 receives the data control signal DCS and the image data signal DATA from the driving controller 100. The data driving circuit 200 converts the image data signal DATA into data signals and outputs the data signals to a plurality of data lines DL1 to DLm (m is a natural number greater than 1), to be described later. The data signals are analog voltages respectively corresponding to gradation values of the image data signal DATA.

The voltage generator 300 generates voltages necessary for the operation of the display panel DP. In this embodiment, the voltage generator 300 generates a first driving voltage ELVDD, a second driving voltage ELVSS, and an initialization voltage VINT.

The display panel DP includes first scan lines GIL0 to GILn (n is a natural number greater than 1), second scan lines GWL1 to GWLn, light emission control lines EML1 to EMLn, the data lines DL1 to DLm, and pixels PX. The display panel DP may further include a scan driving circuit SD and a light emission driving circuit EDC. In an embodiment, the scan driving circuit SD is disposed on a first side (e.g., left side in FIG. 4) of the display panel DP. The first scan lines GIL0 to GILn and the second scan lines GWL1 to GWLn extend in the first direction DR1 from the scan driving circuit SD.

The light emission driving circuit EDC is disposed on a second side (e.g., right side in FIG. 4) of the display panel DP. The light emission control lines EML1 to EMLn extend in a direction opposite to the first direction DR1 from the light emission driving circuit EDC. In an embodiment, the light emission driving circuit EDC may receive a light emission control signal ECS from the driving controller 100.

The first scan lines GIL0 to GILn, the second scan lines GWL1 to GWLn, and the light emission control lines EML1 to EMLn are arranged to be spaced apart from each other in the second direction DR2. The data lines DL1 to DLm extend in a direction opposite to the second direction DR2 from the data driving circuit 200 and are arranged to be spaced apart from each other in the first direction DR1.

In the example illustrated in FIG. 4, the scan driving circuit SD and the light emission driving circuit EDC are arranged to face each other with the pixels PX interposed therebetween, but the invention is not limited thereto. In an embodiment, the scan driving circuit SD and the light emission driving circuit EDC may be disposed adjacent to each other on one of the first side and the second side of the display panel DP, for example. In an embodiment, the scan driving circuit SD and the light emission driving circuit EDC may be constituted as a single circuit.

The plurality of pixels PX is electrically connected respectively to the first scan lines GIL0 to GILn, respectively to the second scan lines GWL1 to GWLn, respectively to the light emission control lines EML1 to EMLn, and respectively to the data lines DL1 to DLm. Each of the plurality of pixels PX may be electrically connected to three scan lines and one light emission control line. In an embodiment, as illustrated in FIG. 4, each of pixels PX in a first row may be connected to the scan lines GIL0, GIL1, and GWL1 and the light emission control line EML1, for example. Also, each of pixels PX in a second row may be connected to the scan lines GIL1, GIL2, and GWL2 and the light emission control line EML2.

Each of the plurality of pixels PX includes a light emitting diode ED (refer to FIG. 5) and a pixel circuit unit PXC (refer to FIG. 5) that controls light emission of the light emitting diode ED. In an embodiment, the light emitting diode ED may be an organic light emitting diode, for example. The pixel circuit unit PXC may include a plurality of transistors and a capacitor. The scan driving circuit SD may include transistors provided through the same process as that of the transistors of the pixel circuit unit PXC.

Each of the plurality of pixels PX receives the first driving voltage ELVDD, the second driving voltage ELVSS, and the initialization voltage VINT from the voltage generator 300.

The scan driving circuit SD receives the scan control signal SCS from the driving controller 100. In response to the scan control signal SCS, the scan driving circuit SD may output first scan signals to the first scan lines GIL0 to GILn and second scan signals to the second scan lines GWL1 to GWLn. The circuit configuration and operation of the scan driving circuit SD will be described in detail later.

The driving controller 100 in an embodiment may divide the display panel DP into the first display area DA1 (refer to FIG. 1) and the second display area DA2 (refer to FIG. 1) based on the image input signal RGB. In addition, the driving controller 100 outputs, in the multi-frequency mode MFMb (refer to FIG. 3C), at least one masking signal indicating a driving/non-driving state of first to third blocks DA2-1, DA2-2, and DA2-3 of the second display area DA2. The at least one masking signal may be included in the scan control signal SCS.

Figure 5:
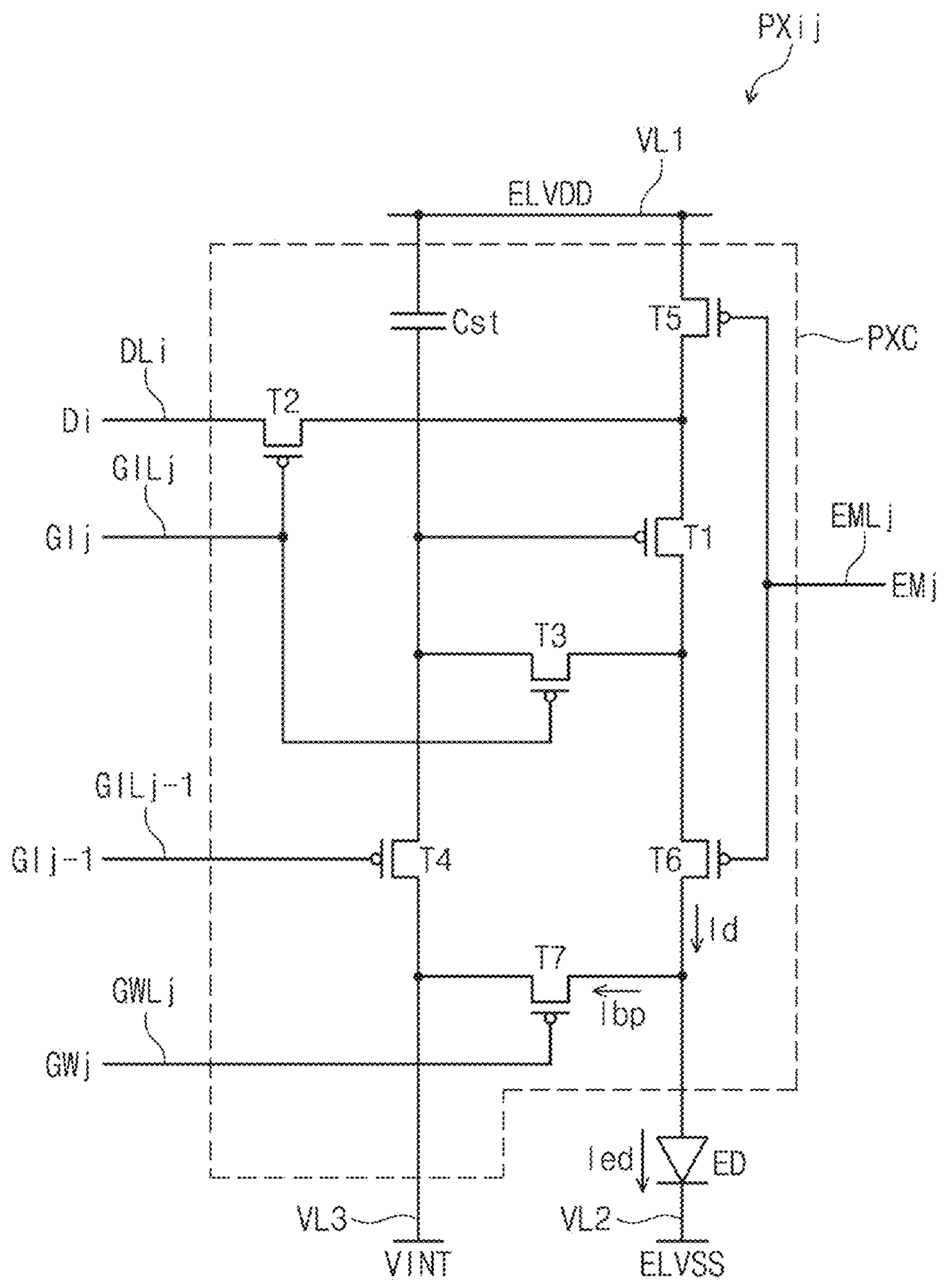
FIG. 5 is an equivalent circuit diagram of an embodiment of one of pixels according to the invention.

FIG. 5 is an equivalent circuit diagram of an embodiment of one of pixels PX according to the invention.

FIG. 5 illustrates an equivalent circuit diagram of a pixel PXij connected to an i-th data line DLi among the data lines DL1 to DLm, a (j−1)-th first scan line GILj−1 and a j-th first scan line GILj among the first scan lines GIL0 to GILn, a j-th second scan line GWLj among the second scan lines GWL1 to GWLn, and a j-th light emission control line EMLj among the light emission control lines EML1 to EMLn illustrated in FIG. 4. Here, i and j may be natural numbers equal to or less than m and n, respectively.

Each of the plurality of pixels PX illustrated in FIG. 4 may have a circuit configuration the same as that of the equivalent circuit diagram of the pixel PXij illustrated in FIG. 5. In this embodiment, the pixel circuit unit PXC of the pixel PXij includes first to seventh transistors T1 to T7 and one capacitor Cst. Further, each of the first to seventh transistors T1 to T7 is a P-type transistor having a low-temperature polycrystalline silicon ("LTPS") semiconductor layer. However, each of the first to seventh transistors T1 to T7 is not limited thereto but may be an N-type transistor having a semiconductor layer of an oxide semiconductor. In an embodiment, at least one of the first to seventh transistors T1 to T7 may be an N-type transistor, and the others may be P-type transistors. Further, the circuit configuration of the pixel PX of the invention is not limited to the circuit configuration of FIG. 5. The pixel circuit unit PXC illustrated in FIG. 5 is only an example, and the configuration of the pixel circuit unit PXC may be modified and implemented.

Referring to FIG. 5, the pixel PXij of the display device DD in an embodiment includes the first to seventh transistors T1 to T7, the capacitor Cst, and at least one light emitting diode ED. In this embodiment, an example in which one pixel PXij includes one light emitting diode ED will be described.

The (j−1)-th first scan line GILj−1, the j-th first scan line GILj, the j-th second scan line GWLj, and the j-th light emission control line EMLj may respectively transmit a (j−1)-th first scan signal GIj−1, a j-th first scan signal GIj, a j-th second scan signal GWj, and a j-th light emission control signal EMj. The i-th data line DLi transmits a i-th data signal Di. The i-th data signal Di may have a voltage level corresponding to the image input signal RGB (refer to FIG. 4) inputted to the display device DD (refer to FIG. 4). First to third driving voltage lines VL1, VL2, and VL3 may respectively transmit the first driving voltage ELVDD, the second driving voltage ELVSS, and the initialization voltage VINT.

The first transistor T1 includes a first electrode connected to the first driving voltage line VL1 via the fifth transistor T5, a second electrode electrically connected to an anode of the light emitting diode ED via the sixth transistor T6, and a gate electrode connected to one end of the capacitor Cst. The first transistor T1 may receive the i-th data signal Di transmitted from the i-th data line DLi according to a switching operation of the second transistor T2 and may provide a driving current Id to the light emitting diode ED.

The second transistor T2 includes a first electrode connected to the i-th data line DLi, a second electrode connected to the first electrode of the first transistor T1, and a gate electrode connected to the j-th first scan line GILj. The second transistor T2 may be turned on according to the j-th first scan signal GIj transmitted through the j-th first scan line GILj and may transmit, to the first electrode of the first transistor T1, the i-th data signal Di transmitted from the i-th data line DLi.

The third transistor T3 includes a first electrode connected to the gate electrode of the first transistor T1, a second electrode connected to the second electrode of the first transistor T1, and a gate electrode connected to the j-th first scan line GILj. The third transistor T3 may be turned on according to the j-th first scan signal GIj transmitted through the j-th first scan line GILj to connect the gate electrode and the second electrode of the first transistor T1 to each other, and thus the first transistor T1 may be diode-connected.

The fourth transistor T4 includes a first electrode connected to the gate electrode of the first transistor T1, a second electrode connected to the third driving voltage line VL3 through which the initialization voltage VINT is transmitted, and a gate electrode connected to the (j−1)-th first scan line GILj−1. The fourth transistor T4 may be turned on according to the (j−1)-th first scan signal GIj−1 transmitted through the (j−1)-th first scan line GILj−1 to transmit the initialization voltage VINT to the gate electrode of the first transistor T1, and thus an initialization operation may be performed which initializes a voltage of the gate electrode of the first transistor T1.

The fifth transistor T5 includes a first electrode connected to the first driving voltage line VL1, a second electrode connected to the first electrode of the first transistor T1, and a gate electrode connected to the j-th light emission control line EMLj.

The sixth transistor T6 includes a first electrode connected to the second electrode of the first transistor T1, a second electrode connected to the anode of the light emitting diode ED, and a gate electrode connected to the j-th light emission control line EMLj.

The fifth transistor T5 and the sixth transistor T6 may be turned on at the same time according to the j-th light emission control signal EMj received through the j-th light emission control line EMLj, and therethrough, the first driving voltage ELVDD may be compensated through the diode-connected first transistor T1 and transmitted to the light emitting diode ED.

The seventh transistor T7 includes a first electrode connected to the second electrode of the fourth transistor T4, a second electrode connected to the second electrode of the sixth transistor T6, and a gate electrode connected to the j-th second scan line GWLj.

As described above, the one end of the capacitor Cst is connected to the gate electrode of the first transistor T1, and the other end is connected to the first driving voltage line VL1. A cathode of the light emitting diode ED may be connected to the second driving voltage line VL2 transmitting the second driving voltage ELVSS. The configuration of the pixel PXij in an embodiment is not limited to the configuration illustrated in FIG. 5, and various changes may be made in the number of each of transistors and capacitors that one pixel PXij includes and the connection relationship thereof.

Figure 6:
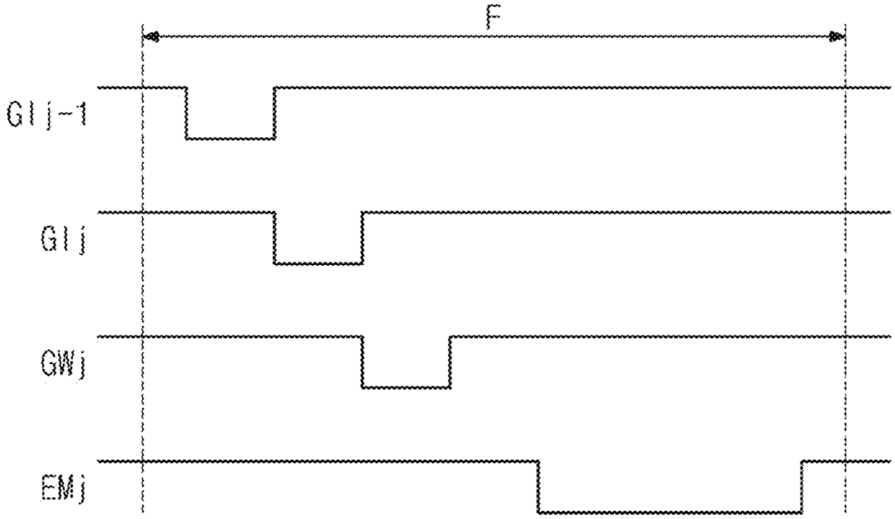
FIG. 6 is a timing diagram for describing an operation of one of the pixels of the display device of FIG. 4.

FIG. 6 is a timing diagram for describing an embodiment of an operation of one of the pixels of the display device of FIG. 4. An operation of the display device in an embodiment will be described with reference to FIG. 5 and FIG. 6.

Referring to FIG. 5 and FIG. 6, a (j−1)-th first scan signal GIj−1 of a low level is provided through the (j−1)-th first scan line GILj−1 during an initialization period in one frame F. In response to the (j−1)-th first scan signal GIj−1 of the low level, the fourth transistor T4 is turned on, and the initialization voltage VINT is transmitted to the gate electrode of the first transistor T1 through the fourth transistor T4, so that the first transistor T1 is initialized.

Subsequently, when a j-th first scan signal GIj of the low level is provided through the j-th first scan line GILj during a data programming and compensation period, the third transistor T3 is turned on. The first transistor T1 is diode-connected and biased in a forward direction by the turned-on third transistor T3. Also, the second transistor T2 is turned on by the j-th first scan signal GIj of the low level. Then, a compensation voltage Di-Vth, which is obtained by subtracting a threshold voltage Vth of the first transistor T1 from the i-th data signal Di provided from the i-th data line DLi, is applied to the gate electrode of the first transistor T1. That is, a gate voltage applied to the gate electrode of the first transistor T1 may be the compensation voltage Di-Vth.

The first driving voltage ELVDD and the compensation voltage Di-Vth may be applied to both ends of the capacitor Cst, and charges corresponding to a difference in voltage between both ends may be stored in the capacitor Cst.

The seventh transistor T7 is turned on by receiving a j-th second scan signal GWj of a low level through the j-th second scan line GWLj. Due to the seventh transistor T7, a portion of the driving current Id may flow through the seventh transistor T7 as a bypass current Ibp.

When the light emitting diode ED emits light even in the case that a minimum driving current of the first transistor T1 for displaying a black image flows as the driving current Id, the black image is not properly displayed. Accordingly, the seventh transistor T7 in the pixel PXij in an embodiment of the invention may divert a portion of the minimum driving current of the first transistor T1, as the bypass current Ibp, to a current path other than a current path toward the light emitting diode ED. Here, the minimum driving current of the first transistor T1 refers to a current under a condition in which the first transistor T1 is turned off because a gate-source voltage of the first transistor T1 is lower than the threshold voltage Vth. The minimum driving current (e.g., a current of about 10 picoamperes (pA) or less) under the condition of turning off the first transistor T1 as above is transmitted to the light emitting diode ED, thereby causing an image of black luminance to be displayed. The diverted transmission of the bypass current Ibp may have a strong influence when the minimum driving current flows for displaying the black image, whereas the bypass current Ibp may be said to have little influence when a large driving current flows for displaying an image such as a general image and a white image. Accordingly, when the driving current Id for displaying a black image flows, a light emission current led of the light emitting diode ED, obtained by subtracting an amount of current of the bypass current Ibp flowing through the seventh transistor T7 from the driving current Id, has a minimum amount of current of a level at which a black image may be accurately displayed. Accordingly, a contrast ratio may be improved by implementing an image of an accurate black luminance using the seventh transistor T7. A bypass signal is the j-th second scan signal GWj of the low level in this embodiment but is not limited thereto.

Thereafter, the level of the j-th light emission control signal EMj provided from the j-th light emission control line EMLj changes from a high level to a low level during a light emission period. During the light emission period, the fifth transistor T5 and the sixth transistor T6 are turned on by the j-th light emission control signal EMj of the low level. Then, the driving current Id is generated according to a voltage difference between a gate voltage of the gate electrode of the first transistor T1 and the first driving voltage ELVDD, and the driving current Id is provided to the light emitting diode ED through the sixth transistor T6, so that the light emission current Ied flows through the light emitting diode ED.

Figure 7:
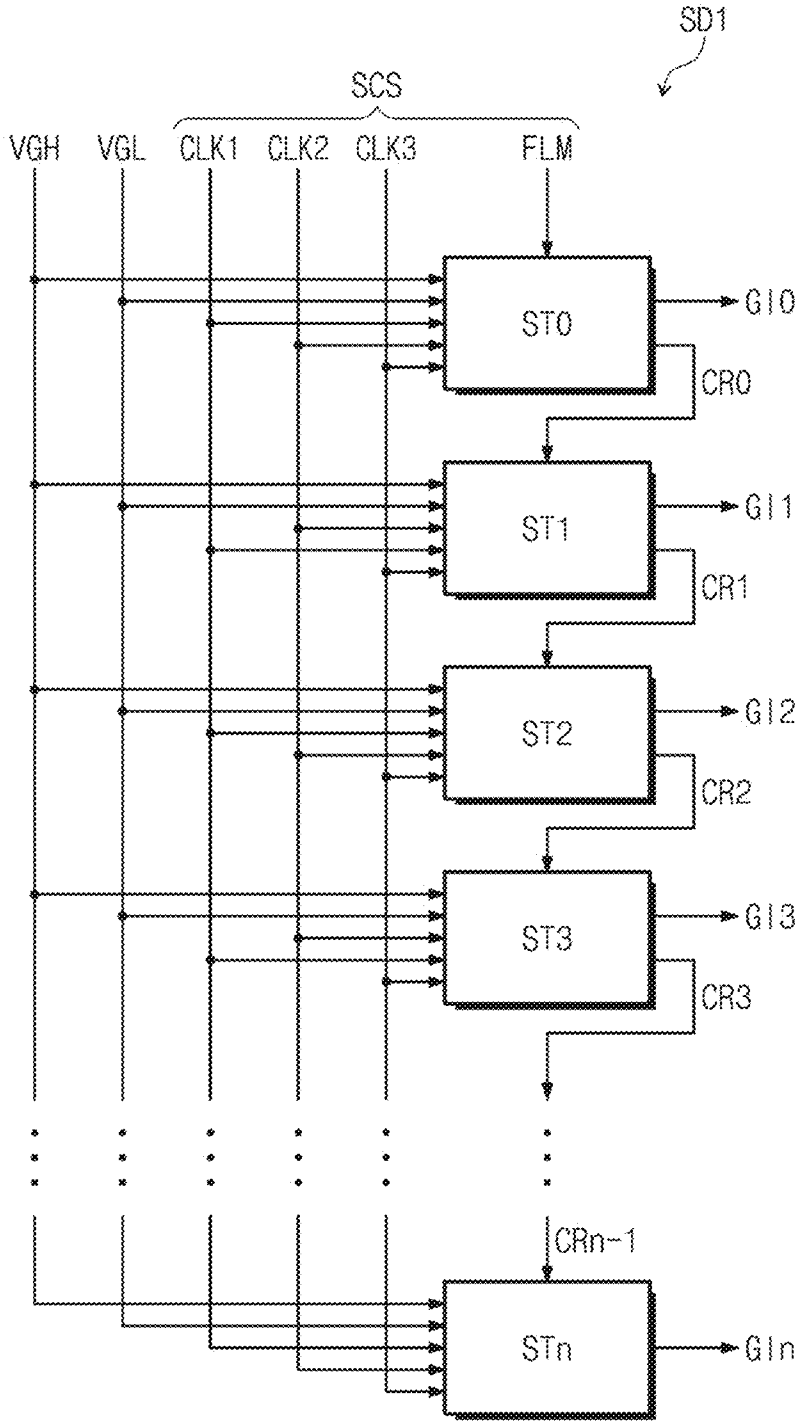
FIG. 7 is a block diagram of an embodiment of a scan driver according to the invention.

FIG. 7 is a block diagram of an embodiment of a scan driver SD1 according to the invention. The scan driver SD1 illustrated in FIG. 7 outputs the first scan signals GI0 to GIn. The scan driving circuit SD illustrated in FIG. 4 may further include, in addition to the scan driver SD1 illustrated in FIG. 7, a scan driver (not illustrated) for outputting the second scan signals GWI to GWn.

Referring to FIG. 7, the scan driver SD1 includes driving stages ST0 to STn.

Each of the driving stages ST0 to STn receives the scan control signal SCS from the driving controller 100 illustrated in FIG. 4. The scan control signal SCS includes a start signal FLM, a first clock signal CLK1, a second clock signal CLK2, and a third clock signal CLK3. The third clock signal CLK3 may function as the masking signal. The third clock signal CLK3 may be also referred to as a masking clock signal. The third clock signal CLK3 may be a signal indicating the driving/non-driving state of the first to third blocks DA2-1, DA2-2, and DA2-3 (refer to FIG. 3C).

In response to the third clock signal CLK3, each of the driving stages ST0 to STn may drive a first portion of the second display area DA2 and may not drive a second portion thereof during the multi-frequency mode MFMb.

During the multi-frequency mode MFMb, the driving controller 100 may divide the second display area DA2 into a plurality of blocks, for example, the first to third blocks DA2-1, DA2-2, and DA2-3, and may output the third clock signal CLK3 so as to drive at least one block corresponding to the first portion among the first to third blocks DA2-1, DA2-2, and DA2-3 and so as not to drive at least one block corresponding to the second portion among the first to third blocks DA2-1, DA2-2, and DA2-3.

Each of the driving stages ST0 to STn receives a first voltage VGL and a second voltage VGH. The first voltage VGL and the second voltage VGH may be provided from the driving controller 100 or the voltage generator 300 illustrated in FIG. 4.

In an embodiment, the driving stages ST0 to STn output the first scan signals GI0 to GIn and carry signals CR0 to CRn−1. The first scan signals GI0 to GIn are respectively provided to the first scan lines GIL0 to GILn illustrated in FIG. 4. The carry signal CRj outputted from a j-th driving stage STj (refer to FIGS. 8 and 9A) among the driving stages ST0 to STn may be provided to a (j+1)-th driving stage STj+1 (refer to FIG. 9A) subsequent to the j-th driving stage STj.

The driving stage ST0 may receive the start signal FLM as a carry signal. The driving stages ST1 to STn have a dependent connection relationship in which each of the driving stages ST1 to STn receives a carry signal outputted from a previous driving stage as a carry signal. In an embodiment, the driving stage ST1 receives the carry signal CR0 outputted from a previous driving stage ST0, and the driving stage ST2 receives the carry signal CRI outputted from a previous driving stage ST1, for example. Although, in FIG. 7, the carry signal CRj outputted from the j-th driving stage STj is provided to a (j+1)-th driving stage STj+1, the invention is not limited thereto. In an embodiment, the carry signal CRj outputted from the j-th driving stage STj may be provided as the carry signal of a (j+k)-th driving stage STj+k (j and k are each a natural number).

Figure 8:
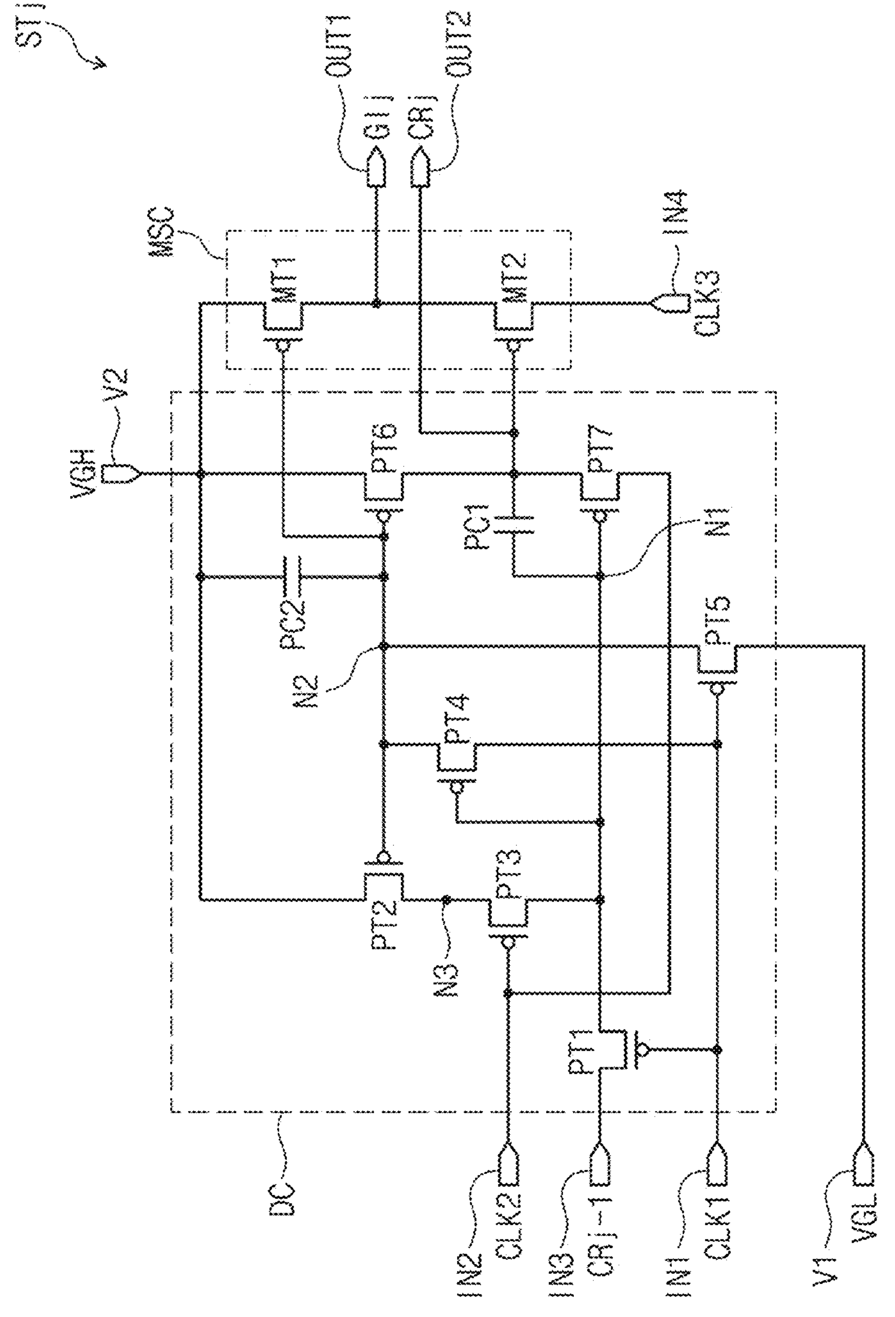
FIG. 8 illustrates a j-th driving stage (j is a positive integer) among the driving stages illustrated in FIG. 7.

FIG. 8 illustrates the j-th driving stage STj (j is a positive integer) among the driving stages ST0 to STn illustrated in FIG. 7. Each of the plurality of driving stages ST0 to STn illustrated in FIG. 7 may include the same circuit configuration as that of the j-th driving stage STj. Hereinafter, the j-th driving stage STj is also referred to as a driving stage STj.

Referring to FIG. 8, the driving stage STj includes a driving circuit DC, a masking circuit MSC, first to fourth input terminals IN1 to IN4, first and second voltage terminals V1 and V2, and first and second output terminals OUT1 and OUT2. The driving circuit DC includes transistors PT1 to PT7 and capacitors PC1 and PC2.

The driving circuit DC receives the first clock signal CLK1, the second clock signal CLK2, the carry signal CRj−1 and the third clock signal CLK3 through the first to fourth input terminals IN1 to IN4, respectively. The driving circuit DC receives the first voltage VGL and the second voltage VGH through the first voltage terminal V1 and the second voltage terminal V2, respectively. The driving circuit DC outputs the first scan signal GIj and the carry signal CRj through the first and second output terminals OUT1 and OUT2, respectively. The carry signal CRj may be provided to the (j+1)-th driving stage STj+1 subsequent to the j-th driving stage STj as the carry signal CRj. The carry signal CRj−1 received through the third input terminal IN3 may be the carry signal CRj−1 outputted from a previous driving stage STj−1 illustrated in FIG. 7. The carry signal of the driving stage ST0 illustrated in FIG. 7 may be the start signal FLM.

In an embodiment, the first input terminal IN1 of each of some driving stages (e.g., odd-numbered driving stages) among the driving stages ST0 to STn illustrated in FIG. 7 receives the first clock signal CLK1, and the second input terminal IN2 thereof receives the second clock signal CLK2, for example. In the embodiment, the first input terminal IN1 of each of some driving stages (e.g., even-numbered driving stages) among the driving stages ST0 to STn receives the second clock signal CLK2, and the second input terminal IN2 thereof receives the first clock signal CLK1, for example.

The transistor PT1 is connected between the third input terminal IN3 and a first node N1 and includes a gate electrode connected to the first input terminal IN1. The transistor PT2 is connected between the second voltage terminal V2 and a third node N3 and includes a gate electrode connected to a second node N2. The transistor PT3 is connected between the third node N3 and the first node N1 and includes a gate electrode connected to the second input terminal IN2.

The transistor PT4 is connected between the second node N2 and the first input terminal IN1 and includes a gate electrode connected to the first node N1. The transistor PT5 is connected between the second node N2 and the first voltage terminal V1 and includes a gate electrode connected to the first input terminal IN1. The transistor PT6 is connected between the second voltage terminal V2 and the second output terminal OUT2 and includes a gate electrode connected to the second node N2. The transistor PT7 is connected between the second output terminal OUT2 and the second input terminal IN2 and includes a gate electrode connected to the first node N1.

The capacitor PC1 is connected between the first node N1 and the second output terminal OUT2. The capacitor PC2 is connected between the second voltage terminal V2 and the second node N2.

The masking circuit MSC includes a first masking transistor MT1 and a second masking transistor MT2. The first masking transistor MT1 may stop (or mask) the output of the first scan signal GIj in response to a signal of the second node N2. The first masking transistor MT1 is connected between the second voltage terminal V2 and the first output terminal OUT1 and includes a gate electrode connected to the second node N2.

The second masking transistor MT2 is connected between the first output terminal OUT1 and the fourth input terminal IN4 and includes a gate electrode connected to the second output terminal OUT2.

Figure 9A:
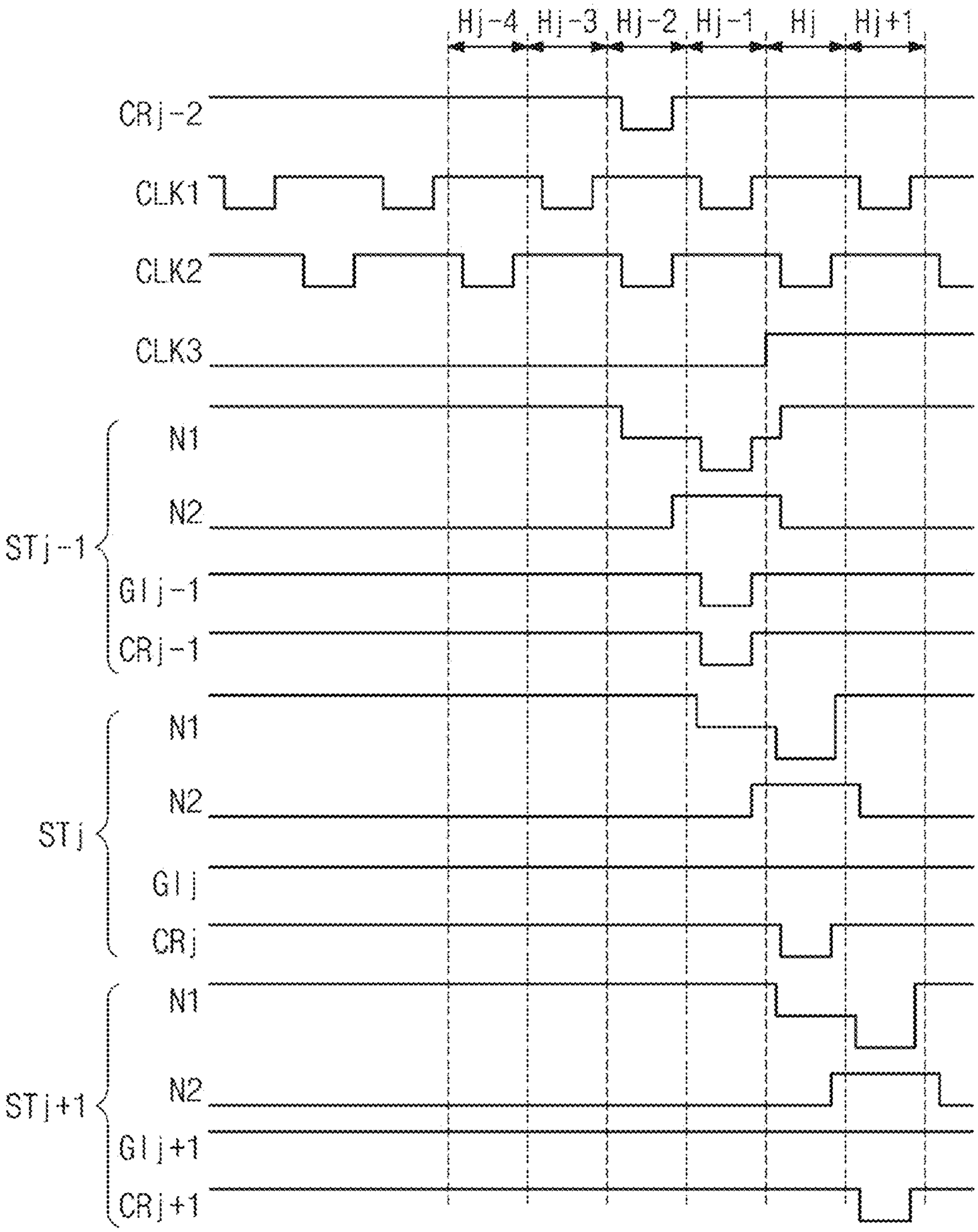
FIG. 9A and FIG. 9B are each a timing diagram illustrating operations of a (j−1)-th driving stage, the j-th driving stage, and a (j+1)-th driving stage in the scan driver illustrated in FIG. 7.
Figure 9B:
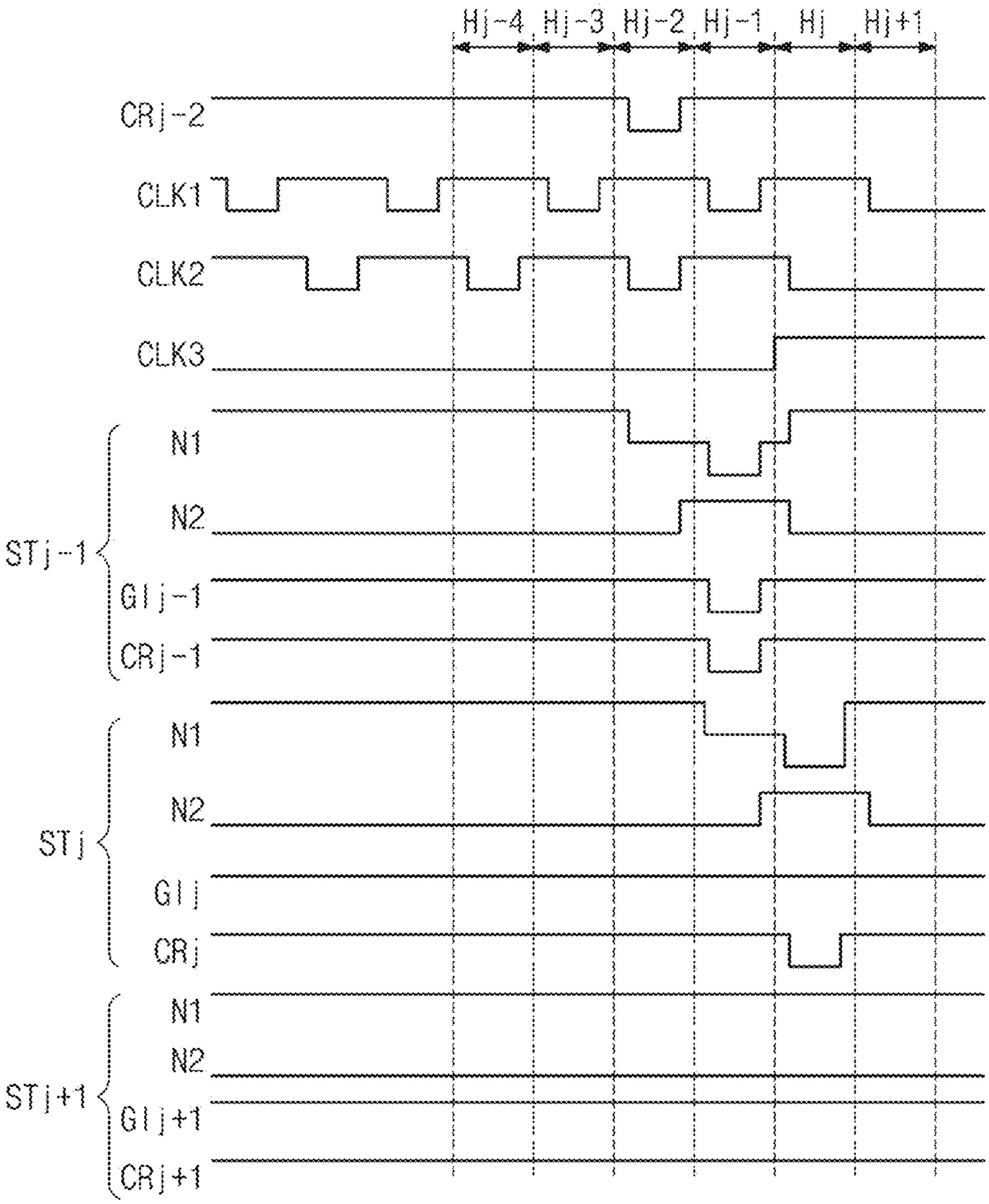

FIG. 9A and FIG. 9B are each a timing diagram illustrating operations of a (j−1)-th driving stage STj−1, the j-th driving stage STj, and the (j+1)-th driving stage STj+1 in the scan driver SD1 illustrated in FIG. 7.

Referring to FIG. 7, FIG. 8, and FIG. 9A, the first clock signal CLK1 and the second clock signal CLK2 are signals that have the same frequency and transition to an active level (e.g., a low level) in different horizontal periods H. Each of the horizontal periods H is a period of time during which pixels PX in one row in the first direction DR1 of the display panel DP (refer to FIG. 4) are driven. The horizontal periods H may include a (j−4)-th horizontal period Hj−4, a (j−3)-th horizontal period Hj−3, a (j−2)-th horizontal period Hj−2, a (j−1)-th horizontal period Hj−1, a j-th horizontal period Hj, and a (j+1)-th horizontal period Hj+1, for example.

The (j−1)-th driving stage STj−1 operates as follows.

The (j−1)-th driving stage STj−1 receives the second clock signal CLK2 through the first input terminal IN1 and receives the first clock signal CLK1 through the second input terminal IN2.

When the second clock signal CLK2 received through the first input terminal IN1 is at the low level in the (j−2)-th horizontal period Hj−2, the transistor PT1 in the driving circuit DC is turned on. As the transistor PT1 is turned on, a carry signal CRj−2 of a low level is transmitted to the first node N1 through the transistor PT1. When the second clock signal CLK2 is at the low level, the transistor PT5 is turned on and the second node N2 is discharged to the first voltage VGL. When the second node N2 is at the low level, the transistor PT6 is turned on, and the second output terminal OUT2 outputs a carry signal CRj−1 of a high level. In addition, when the first node N1 is at the low level, the transistor PT7 is turned on, and thus the second output terminal OUT2 is maintained at a high level by the first clock signal CLK1 received through the second input terminal IN2.

When the second clock signal CLK2 is at the high level in the (j−1)-th horizontal period Hj−1, the transistor PT5 is turned off, and the level of the second node N2 becomes the high level by the transistor PT4 of a turned-on state, so that the transistor PT6 and the first masking transistor MT1 are turned off. When the first clock signal CLK1 received through the second input terminal IN2 is at the low level, the level of the first node N1 is changed to a level lower than the low level of the first node N1 by the capacitor PC1, and the transistor PT7 is turned on, so that the second output terminal OUT2 may output a carry signal CRj−1 of the low level. Because the third clock signal CLK3 is at a low level when the second output terminal OUT2 outputs the carry signal CRj−1 of the low level, the first scan signal GIj−1 outputted to the first output terminal OUT1 is also activated at the low level. That is, the (j−1)-th driving stage STj−1 outputs the first scan signal GIj−1 of the low level and the carry signal CRj−1 of the low level in the (j−1)-th horizontal period Hj−1.

In the j-th horizontal period Hj, the third clock signal CLK3 transitions from the low level to a high level.

The j-th driving stage STj operates as follows.

The j-th driving stage STj receives the first clock signal CLK1 through the first input terminal IN1 and receives the second clock signal CLK2 through the second input terminal IN2.

When the first clock signal CLK1 is at the low level in the (j−1)-th horizontal period Hj−1, the transistor PT1 is turned on. As the transistor PT1 is turned on, the carry signal CRj−1 of the low level is transmitted to the first node N1 through the transistor PT1. When the first clock signal CLK1 is at the low level, the transistor PT5 is turned on, and the second node N2 is discharged to the first voltage VGL. When the second node N2 is at the low level, the transistor PT6 is turned on, and the second output terminal OUT2 outputs a carry signal CRj of the high level. In addition, when the first node N1 is at the low level, the transistor PT7 is turned on, and thus the second output terminal OUT2 is maintained at the high level by the second clock signal CLK2 received through the second input terminal IN2.

When the first clock signal CLK1 is at the high level in the j-th horizontal period Hj, the transistor PT5 is turned off, and the level of the second node N2 becomes the high level by the transistor PT4 of the turned-on state, so that the transistor PT6 is turned off. When the second clock signal CLK2 received through the second input terminal IN2 is at the low level, the level of the first node N1 is changed to a level lower than the low level of the first node N1 by the capacitor PC1, so that the second output terminal OUT2 may output a carry signal CRj of the low level. At this time, the third clock signal CLK3 is at the high level, and thus, through the second masking transistor MT2, the first scan signal GIj is maintained at a high level. That is, the j-th driving stage STj outputs the first scan signal GIj of the high level and the carry signal CRj of the low level in the j-th horizontal period Hj. The (j+1)-th driving stage STj+1 operates as follows.

The (j+1)-th driving stage STj+1 receives the second clock signal CLK2 through the first input terminal IN1 and receives the first clock signal CLK1 through the second input terminal IN2.

When the second clock signal CLK2 received through the first input terminal IN1 is at the low level in the j-th horizontal period Hj, the transistor PT1 in the driving circuit DC is turned on. As the transistor PT1 is turned on, the carry signal CRj of the low level is transmitted to the first node N1 through the transistor PT1. When the second clock signal CLK2 is at the low level, the transistor PT5 is turned on and the second node N2 is discharged to the first voltage VGL. When the second node N2 is at the low level, the transistor PT6 is turned on, and the second output terminal OUT2 outputs a carry signal CRj+1 of the high level. In addition, when the first node N1 is at the low level, the transistor PT7 is turned on, and thus the second output terminal OUT2 is maintained at the high level by the first clock signal CLK1 received through the second input terminal IN2.

When the second clock signal CLK2 is at the high level in the (j+1)-th horizontal period Hj+1, the transistor PT5 is turned off, and the level of the second node N2 becomes the high level by the transistor PT4 of the turned-on state, so that the transistor PT6 and the first masking transistor MT1 are turned off. When the first clock signal CLK1 received through the second input terminal IN2 is at the low level, the level of the first node N1 is changed to a level lower than the low level of the first node N1 by the capacitor PC1, and the transistor PT7 is turned on, so that the second output terminal OUT2 may output a carry signal CRj+1 of the low level. Because the third clock signal CLK3 is at the high level when the second output terminal OUT2 outputs the carry signal CRj+1 of the low level, the first scan signal GIj+1 outputted to the first output terminal OUT1 is maintained at the high level. That is, the (j+1)-th driving stage STj+1 outputs the first scan signal GIj+1 of the high level and the carry signal CRj+1 of the low level in the (j+1)-th horizontal period Hj+1.

As illustrated in FIG. 7, FIG. 8, and FIG. 9A, when the third clock signal CLK3 transitions from the low level to the high level, the first scan signals GIj and GIj+1 may be maintained in an inactive state of the high level, and the carry signals CRj and CRj+1 may be respectively transmitted to corresponding subsequent stages.

FIG. 9B illustrates a method of maintaining the carry signal CRj+1 as well as the first scan signals GIj and GIj+1 in the inactive state of the high level.

Referring to FIG. 7, FIG. 8, and FIG. 9B, when the first clock signal CLK1 is at the high level in the j-th horizontal period Hj, the transistor PT5 of the j-th driving stage STj is turned off, and the level of the second node N2 becomes the high level by the transistor PT4 of the turned-on state, so that the transistor PT6 is turned off. When the second clock signal CLK2 received through the second input terminal IN2 is at the low level, the level of the first node N1 is changed to a level lower than the low level of the first node N1 by the capacitor PC1, and the transistor PT7 is turned on, so that the second output terminal OUT2 may output the carry signal CRj of the low level. At this time, the first scan signal GIj is maintained at the high level by the third clock signal CLK3 of the high level. That is, the j-th driving stage STj outputs the first scan signal GIj of the high level and the carry signal CRj of the low level in the j-th horizontal period Hj.

In the (j+1)-th horizontal period Hj+1, the transistor PT5 is turned on by the second clock signal CLK2 of the low level received through the first input terminal IN1. The second node N2 is maintained at the low level by the turned-on transistor PT5, and the transistor PT6 is turned on. Accordingly, the carry signal CRj+1 of the high level may be outputted. The first scan signal GIj+1 is maintained at the high level by the third clock signal CLK3 of the high level. That is, the (j+1)-th driving stage STj+1 outputs the first scan signal GIj+1 of the high level and the carry signal CRj+1 of the high level in the (j+1)-th horizontal period Hj+1.

As illustrated in FIG. 9A and FIG. 9B, the third clock signal CLK3 may mask the output of the first scan signals GIj and GIj+1. In addition, when both the first clock signal CLK1 and the second clock signal CLK2 are at the low level, the output of the carry signal CRj+1 may be masked.

Figure 10:
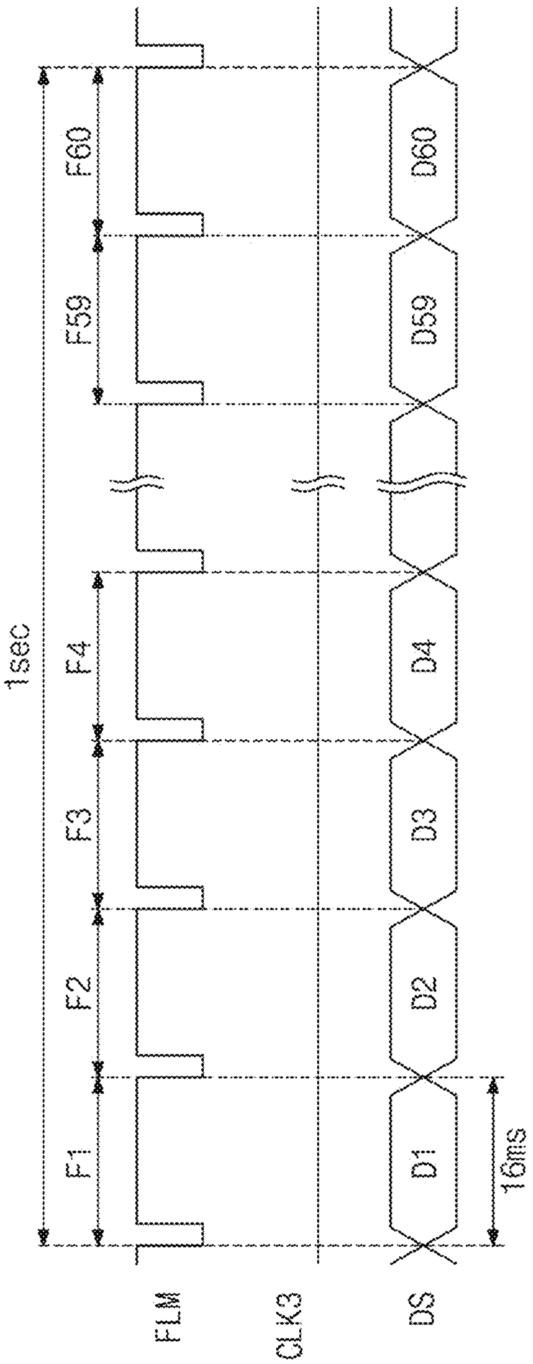
FIG. 10 is a timing diagram, in the normal mode of FIG. 3A, illustrating a start signal and a third clock signal provided from a driving controller to a scan driver, and an image signal provided to a display panel.

FIG. 10 is a timing diagram, in the normal mode NFM of FIG. 3A, illustrating the start signal FLM and the third clock signal CLK3 provided from the driving controller 100 (refer to FIG. 4) to the scan driver SD1 (refer to FIG. 7), and an image signal DS provided to the display panel DP.

Referring to FIG. 4 and FIG. 10, the start signal FLM may be activated at a low level in each of the frames from the first frame F1 to the 60th frame F60 of the normal mode NFM. During the normal mode NFM, the third clock signal CLK3 is maintained at the low level. While the third clock signal CLK3 is at the low level, the driving stages ST0 to STn may respectively output the first scan signals GI0 to GIn.

In an embodiment, each of the first to 60th frames F1 to F60 has the same duration of about 16 milliseconds (ms).

The image signal DS provided to the display panel DP in the normal mode NFM may include image signals D1 to D60 to be displayed in the first display area DA1 and the second display area DA2 illustrated in FIG. 1.

Figure 11:
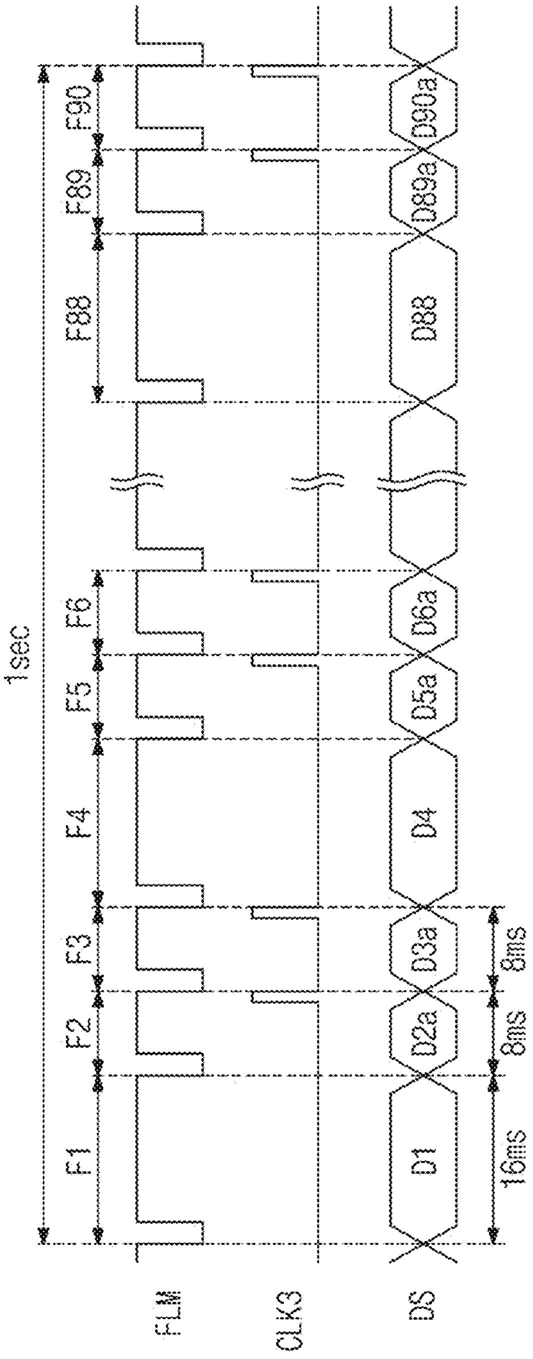
FIG. 11 is a timing diagram, in the multi-frequency mode of FIG. 3B, illustrating a start signal and a third clock signal provided from a driving controller to a scan driver, and an image signal provided to a display panel.

FIG. 11 is a timing diagram, in the multi-frequency mode MFMa of FIG. 3B, illustrating the start signal FLM and the third clock signal CLK3 provided from the driving controller 100 (refer to FIG. 4) to the scan driver SD1 (refer to FIG. 7), and an image signal DS provided to the display panel DP.

Referring to FIG. 4 and FIG. 11, in the multi-frequency mode MFMa, the display device DD may set, to the first driving frequency, the driving frequency of the first display area DA1 in which the first image IM1, i.e., a moving image, is displayed, and may set, to the second driving frequency lower than the first driving frequency, the driving frequency of the second display area DA2 in which the second image IM2, i.e., a still image, is displayed. In an embodiment, when the normal frequency is about 60 Hz, the first driving frequency may be about 90 Hz, and the second driving frequency may be about 30 Hz, for example.

In an embodiment, a portion of the image signal DS provided to the display panel DP in the (3*a*+1)-th frames F1, F4, . . . , and F88 may include (3*a*+1)-th image signals D1, D4, . . . , and D88 to be displayed in the first display area DA1 and the second display area DA2 illustrated in FIG. 1, for example.

Another portion of the image signal DS provided to the display panel DP in the (3*a*+3)-th and (3*a*+2)-th frames F2, F3, F5, F6, . . . , F89, and F90 may include (3*a*+2)-th and (3*a*+2)-th image signals D2*a*, D3*a*, D5*a*, D6*a*, . . . , D89*a*, and D90*a* to be displayed in the first display area DA1 illustrated in FIG. 1.

In an embodiment, the duration of each of the (3*a*+1)-th frames F1, F4, . . . , and F88 may be about 16 ms, and the duration of each of the (3*a*+3)-th and (3*a*+2)-th frames F2, F3, F5, F6, . . . , F89, and F90 may be about 8 ms, for example.

When there is a difference between the durations of the first to 90th frames F1 to F90 as illustrated in FIG. 11, the deviation of pixel light emission time caused by a difference in frame switching speed (or frame rate) may be perceived by a user as a judder phenomenon such as a flicker.

Figure 12:
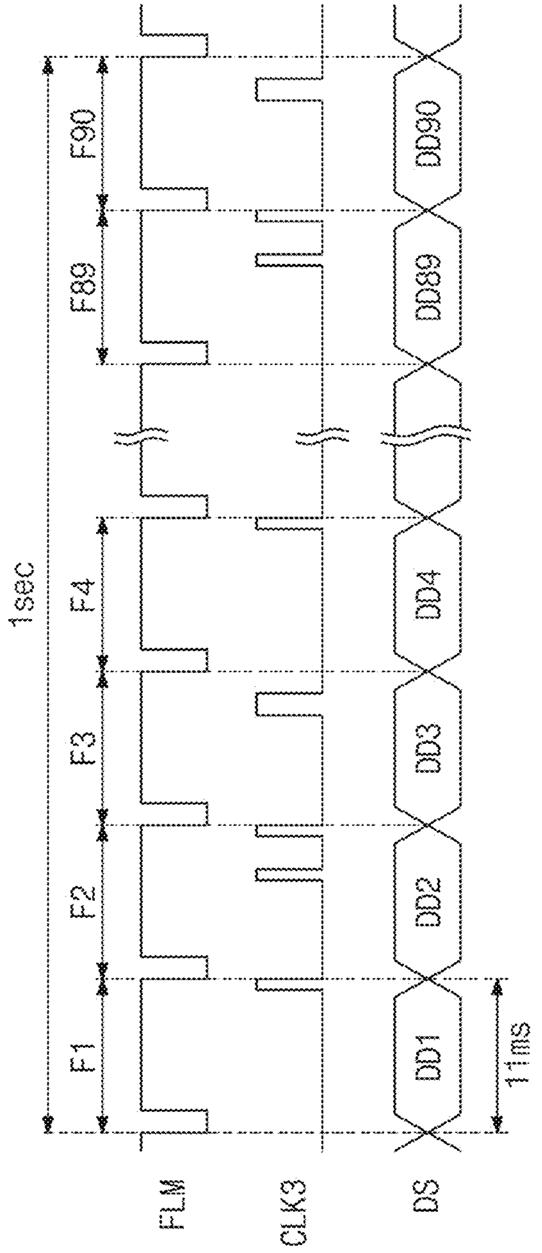
FIG. 12 is a timing diagram, in the multi-frequency mode of FIG. 3C, illustrating a start signal and a third clock signal provided from a driving controller to a scan driver, and an image signal provided to a display panel.

FIG. 12 is a timing diagram, in the multi-frequency mode MFMb of FIG. 3C, illustrating the start signal FLM and the third clock signal CLK3 provided from the driving controller 100 (refer to FIG. 4) to the scan driver SD1 (refer to FIG. 7), and an image signal DS provided to the display panel DP.

Referring to FIG. 3C and FIG. 12, in the multi-frequency mode MFMb, the display device DD may set, to the first driving frequency, the driving frequency of the first display area DA1 in which the first image IM1, i.e., a moving image, is displayed, and may set, to the second driving frequency lower than the first driving frequency, the driving frequency of the second display area DA2 in which the second image IM2, i.e., a still image, is displayed. In an embodiment, when the normal frequency is about 60 Hz, the first driving frequency may be about 90 Hz, and the second driving frequency may be about 30 Hz, for example.

The image signal DS provided to the display panel DP in each of the first to 90th frames F1 to F90 may include image signals DD1 to DD90 each including an image signal to be displayed in the first display area DA1 and an image signal to be displayed in a portion of the second display area DA2 illustrated in FIG. 1.

Figure 13:
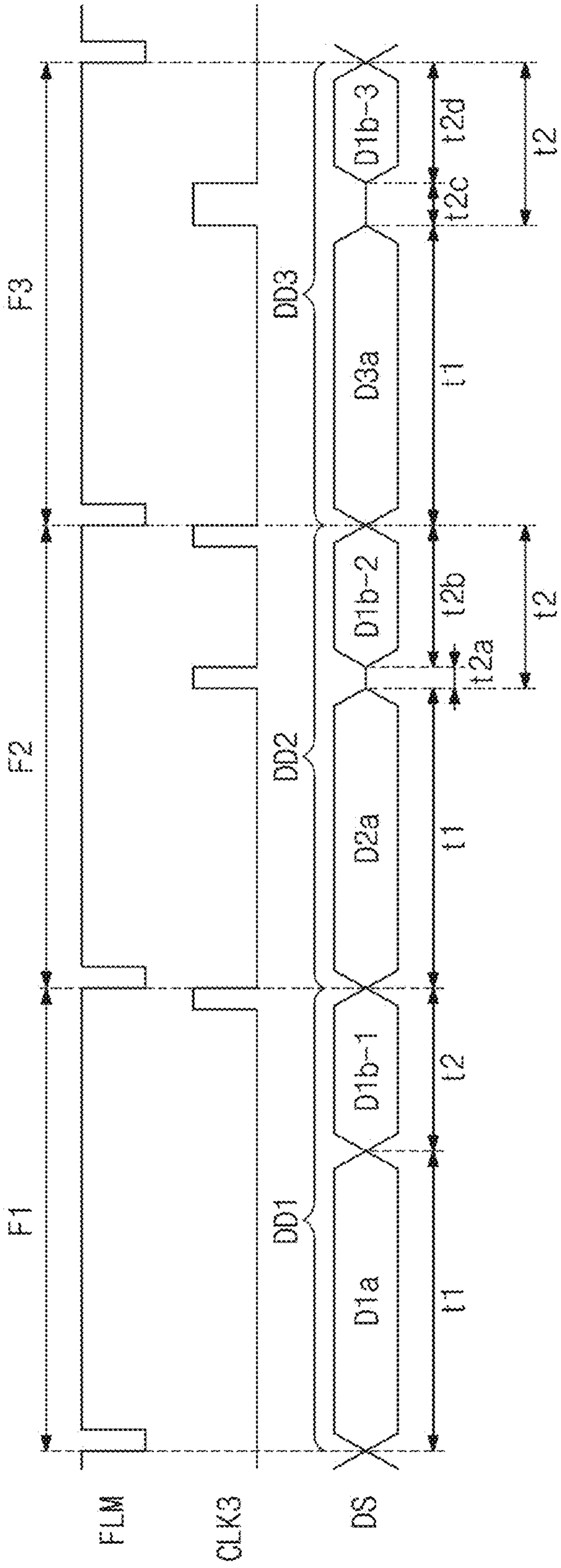
FIG. 13 is a timing diagram illustrating the start signal, the third clock signal, and the image signal in some of the frames illustrated in FIG. 12.

FIG. 13 is a timing diagram illustrating the start signal FLM, the third clock signal CLK3, and the image signal DS in some frames F1, F2, and F3 of the frames illustrated in FIG. 12.

Figure 14A:
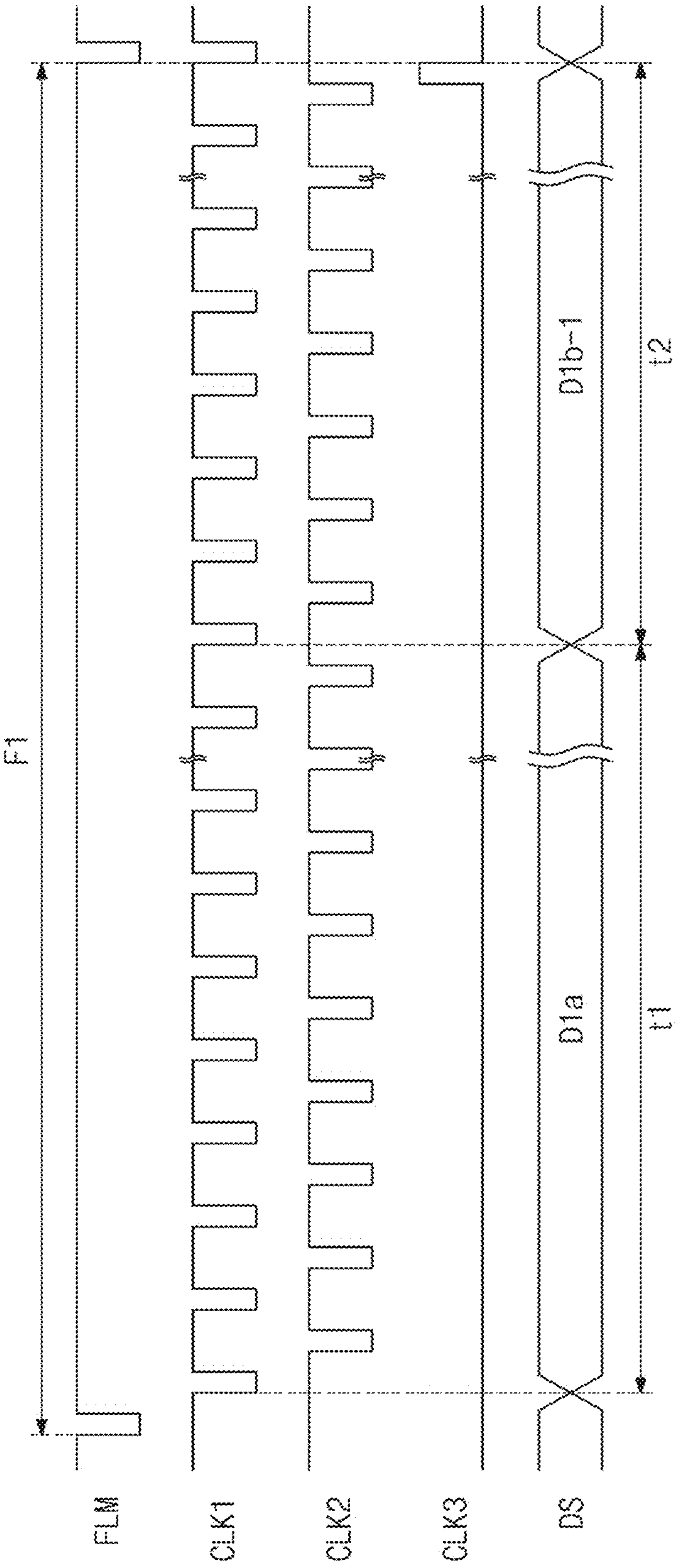
FIG. 14A is an enlarged timing diagram illustrating the first frame illustrated in FIG. 13.

FIG. 14A is an enlarged timing diagram illustrating the first frame F1 illustrated in FIG. 13.

Figure 14B:
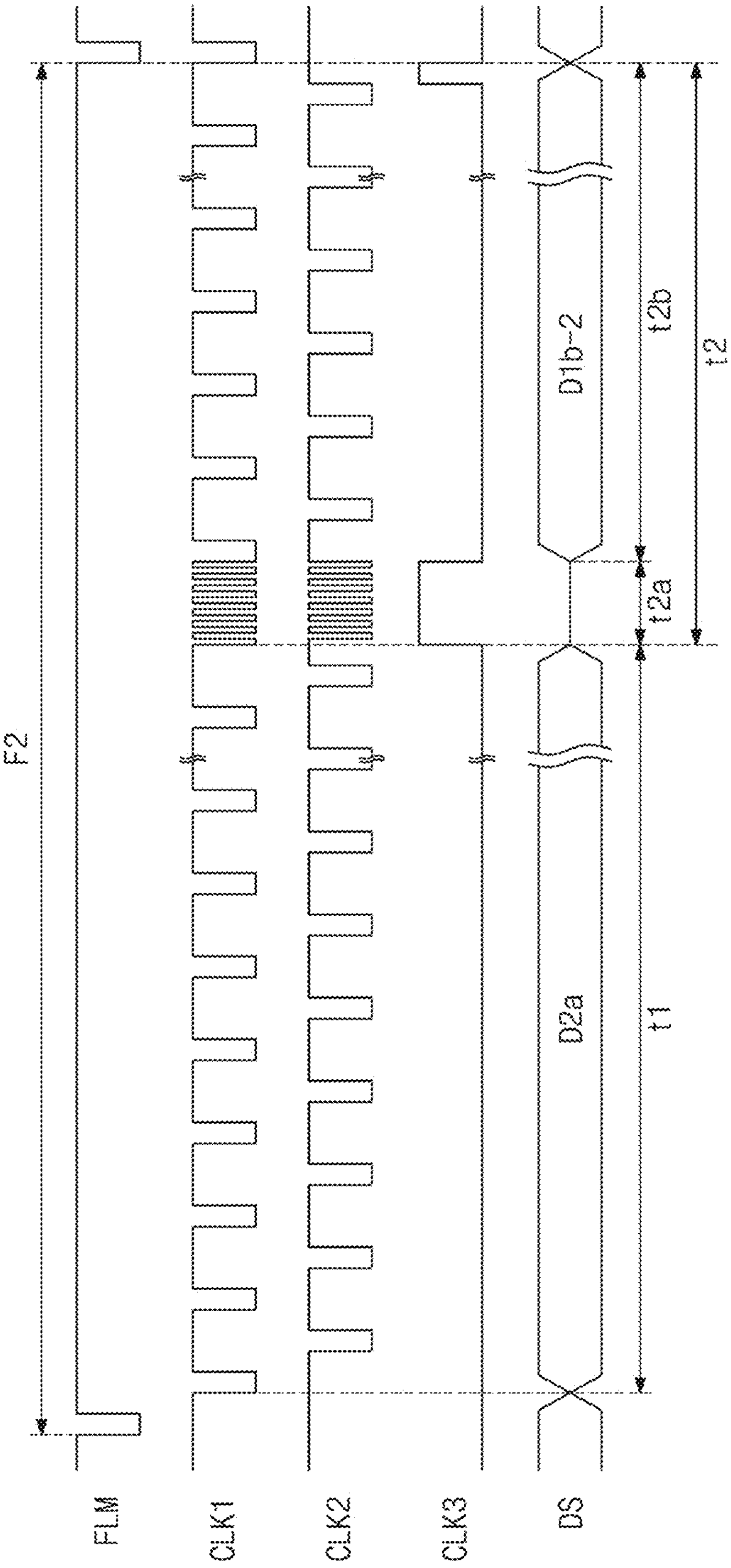
FIG. 14B is an enlarged timing diagram illustrating the second frame illustrated in FIG. 13.

FIG. 14B is an enlarged timing diagram illustrating the second frame F2 illustrated in FIG. 13.

Figure 14C:
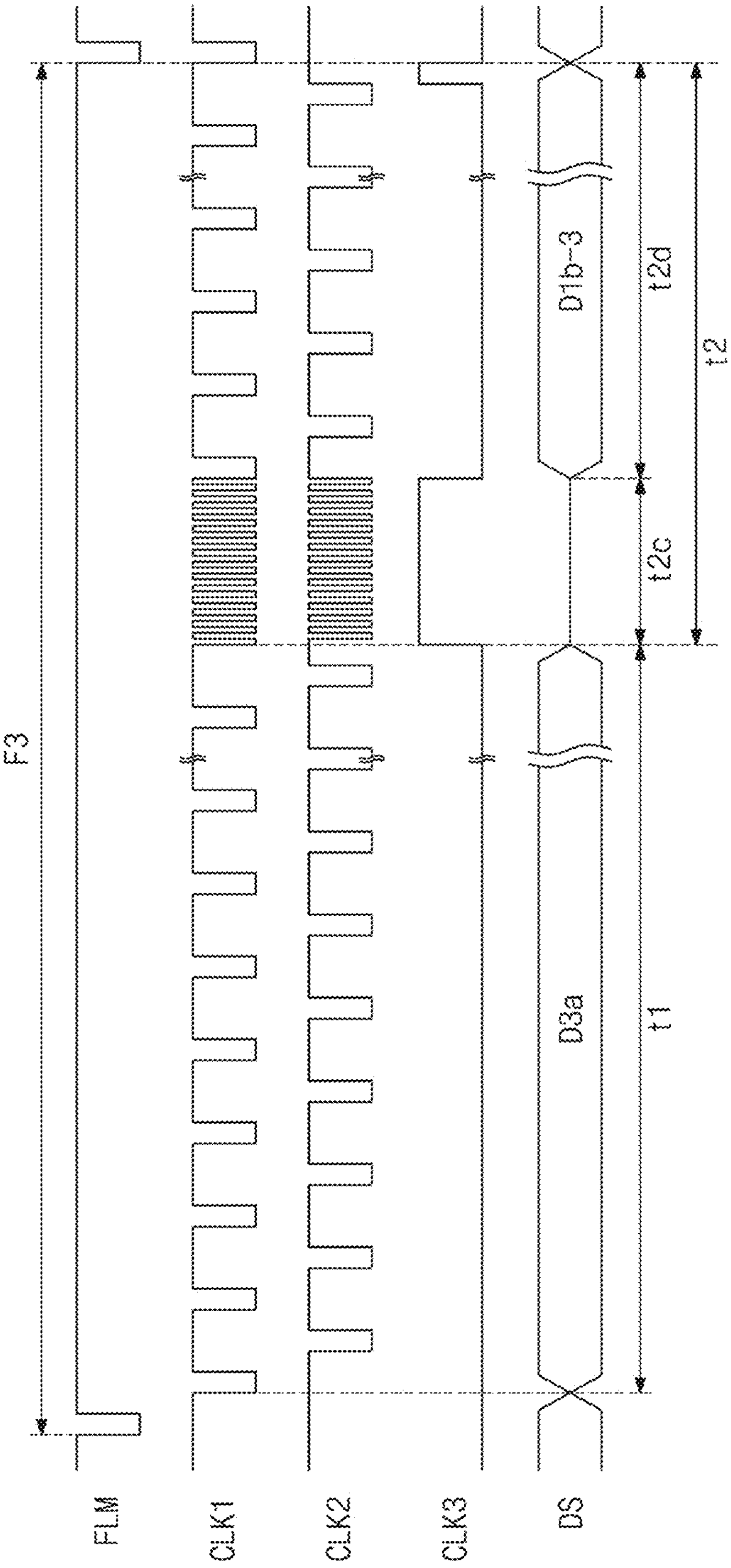
FIG. 14C is an enlarged timing diagram illustrating the third frame illustrated in FIG. 13.

FIG. 14C is an enlarged timing diagram illustrating the third frame F3 illustrated in FIG. 13.

Referring to FIG. 3C, FIG. 13, and FIG. 14A, the image signal DD1 provided to the display panel DP during the first frame F1 includes a first area image signal D1*a* to be displayed in the first display area DA1 and a first block image signal D1*b*-1 to be displayed in the first block DA2-1 of the second display area DA2. The third clock signal CLK3 transitions to the high level after a last scan line of the first block DA2-1 is driven, and thus a first scan signal to be provided to a first scan line of the second block DA2-2 may be maintained at the high level.

During the first frame F1, the first clock signal CLK1 and the second clock signal CLK2 may be maintained at the first driving frequency (e.g., about 90 Hz).

Referring to FIG. 3C, FIG. 13, and FIG. 14B, the image signal DD2 provided to the display panel DP during the second frame F2 includes a first area image signal D2*a* to be displayed in the first display area DA1 and a second block image signal D1*b*-2 to be displayed in the second block DA2-2 of the second display area DA2. The third clock signal CLK3 transitions to the high level after a last scan line of the first display area DA1 is driven, and thus a first scan signal to be provided to a first scan line of the first block DA2-1 may be maintained at the high level.

During a first delay time t2*a*, frequencies of the first clock signal CLK1 and the second clock signal CLK2 may be maintained higher than the second first driving frequency (e.g., about 90 Hz). In an embodiment, during the first delay time t2*a*, the frequencies of the first clock signal CLK1 and the second clock signal CLK2 may be frequencies several tens of times (e.g., about 20 to about 40 times) higher than the first driving frequency, for example.

As the frequencies of the first and second clock signals CLK1 and CLK2 increase, the operation speed of driving stages corresponding to the first block DA2-1 becomes higher. As the frequencies of the first and second clock signals CLK1 and CLK2 increase, the transmission speed of carry signals of the driving stages corresponding to the first block DA2-1 may increase.

The third clock signal CLK3 transitions to the low level after the first delay time t2*a* elapses, and thus first scan signals may be driven at the low level from the first scan line of the second block DA2-2. The third clock signal CLK3 transitions to the high level after a last scan line of the second block DA2-2 is driven, and thus a first scan signal to be provided to a first scan line of the third block DA2-3 may be maintained at the high level.

Referring to FIG. 3C, FIG. 13, and FIG. 14C, the image signal DD3 provided to the display panel DP during the third frame F3 includes a first area image signal D3*a* to be displayed in the first display area DA1 and a third block image signal D1*b*-3 to be displayed in the third block DA2-3 of the second display area DA2. The third clock signal CLK3 transitions to the high level after the last scan line of the first display area DA1 is driven, and thus first scan signals to be provided to from the first scan line of the first block DA2-1 to the last scan line of the second block DA2-2 may be maintained at the high level.

During a second delay time t2*c*, the frequencies of the first clock signal CLK1 and the second clock signal CLK2 may be maintained higher than the first driving frequency (e.g., about 90 Hz). In an embodiment, during the second delay time t2*c*, the frequencies of the first clock signal CLK1 and the second clock signal CLK2 may be frequencies several tens of times (e.g., about 20 to about 40 times) higher than the second driving frequency, for example.

As the frequencies of the first and second clock signals CLK1 and CLK2 increase, the operation speed of driving stages corresponding to the first block DA2-1 and the second block DA2-2 becomes higher. As the frequencies of the first and second clock signals CLK1 and CLK2 increase, the transmission speed of carry signals of the driving stages corresponding to the first block DA2-1 and the second block DA2-2 may increase.

The third clock signal CLK3 may transition to the low level after the second delay time t2*c* elapses, and thus first scan signals may be driven at the low level from the first scan line of the third block DA2-3.

In the first frame F1, a time t1 during which the first area image signal D1*a* corresponding to the first display area DA1 is provided to the display panel DP may be about 8 ms, for example. A time t2 during which the first block image signal D1*b*-1 corresponding to the first block DA2-1 of the second display area DA2 is provided to the display panel DP may be about 3 ms, for example.

In the second frame F2, a time t1 during which the first area image signal D2*a* corresponding to the first display area DA1 is provided to the display panel DP may be about 8 ms, for example. A sum t2 of the first delay time t2*a* and a time t2*b* during which the second block image signal D1*b*-2 corresponding to the second block DA2-2 of the second display area DA2 is provided to the display panel DP may be about 3 ms (t2=t2*a*+t2*b*), for example.

In the third frame F3, a time t1 during which the first area image signal D3*a* corresponding to the first display area DA1 is provided to the display panel DP may be about 8 ms, for example. A sum t2 of the second delay time t2*c* and a time t2*d* during which the third block image signal D1*b*-3 corresponding to the third block DA2-3 of the second display area DA2 is provided to the display panel DP may be about 3 ms (12=t2*c*+t2*d*), for example.

In this embodiment, the first delay time t2*a* is a carry transmission time of the driving stages corresponding to the first block DA2-1, and the second delay time t2*c* is a carry transmission time of the driving stages corresponding to the first block DA2-1 and the second block DA2-2. Accordingly, the second delay time t2*c* may be longer than the first delay time t2*a*.

The method in which the first to third frames F1 to F3 illustrated in FIG. 13 are driven may be repeatedly employed in driving fourth to 90th frames F4 to F90 illustrated in FIG. 12.

Referring to FIG. 3C and FIG. 12, in the multi-frequency mode MFMb, the display device DD sets, to the first driving frequency, the driving frequency of the first display area DA1 in which the first image IM1, i.e., a moving image, is displayed, and sets, to the second driving frequency lower than the first driving frequency, the driving frequency of the second display area DA2 in which the second image IM2, i.e., a still image, is displayed In the multi-frequency mode MFMb, the display device DD may set the driving frequency of the second display area DA2 to the second driving frequency lower than the first driving frequency by dividing the second display area DA2 into the first to third blocks DA2-1, DA2-2, and DA2-3 and driving the first to third blocks DA2-1, DA2-2, and DA2-3 alternately and sequentially.

As described above, the duration of each of the first to 90th frames F1 to F90 may be constant at about 11 ms, for example, even when the first driving frequency of the first display area DA1 and the second driving frequency of the second display area DA2 are different from each other. As the durations of the first to 90th frames F1 to F90 become uniform, degradation of display quality such as a judder phenomenon may be prevented.

The number of blocks of the second display area DA2 may be determined depending on a ratio of the first driving frequency of the first display area DA1 to the second driving frequency of the second display area DA2.

Table 1 below shows the number of blocks of the second display area DA2 depending on the first driving frequency of the first display area DA1 and the second driving frequency of the second display area DA2.

TABLE 1

| First driving frequency of first display area DA1 | Second driving frequency of second display area DA2 | Number of blocks in second display area DA2 |
|---|---|---|
| 80 | 40 | 2 |
| 90 | 30 | 3 |
| 100 | 20 | 5 |
| 105 | 15 | 7 |
| 114 | 6 | 19 |

Figure 15:
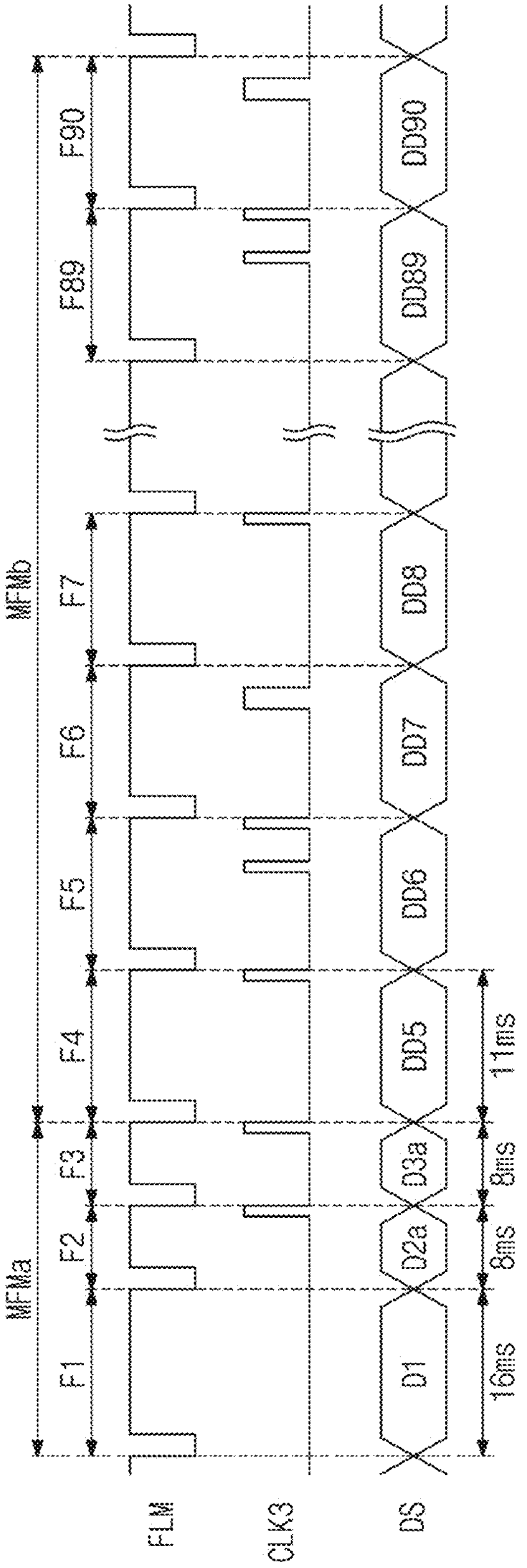
FIG. 15 is a timing diagram, in the multi-frequency mode of FIG. 3C, illustrating a start signal and a third clock signal provided from a driving controller to a scan driver, and an image signal provided to a display panel.

FIG. 15 is a timing diagram, in the multi-frequency mode MFMb of FIG. 3C, illustrating the start signal FLM and the third clock signal CLK3 provided from the driving controller 100 (refer to FIG. 4) to the scan driver SD1 (refer to FIG. 7), and an image signal DS provided to the display panel DP.

Referring to FIG. 15, in the multi-frequency mode, the display device DD may set, to the first driving frequency, the driving frequency of the first display area DA1 in which the first image IM1, i.e., a moving image, is displayed, and may set, to the second driving frequency lower than the first driving frequency, the driving frequency of the second display area DA2 in which the second image IM2, i.e., a still image, is displayed. In an embodiment, when the normal frequency is about 60 Hz, the first driving frequency may be about 90 Hz, and the second driving frequency may be about 30 Hz, for example.

The display device DD may drive the first to third frames F1 to F3 in the same manner as in the multi-frequency mode MFMa illustrated in FIG. 11, and may drive the fourth to 90th frames F4 to F90 in the same manner as in the multi-frequency mode MFMb illustrated in FIG. 12.

That is, the display device DD may be prepared, during the first to third frames F1 to F3, to drive the first to third blocks DA2-1, DA2-2, and DA2-3 of the second display area DA2 in the fourth to 90th frames F4 to F90.

Figure 16:
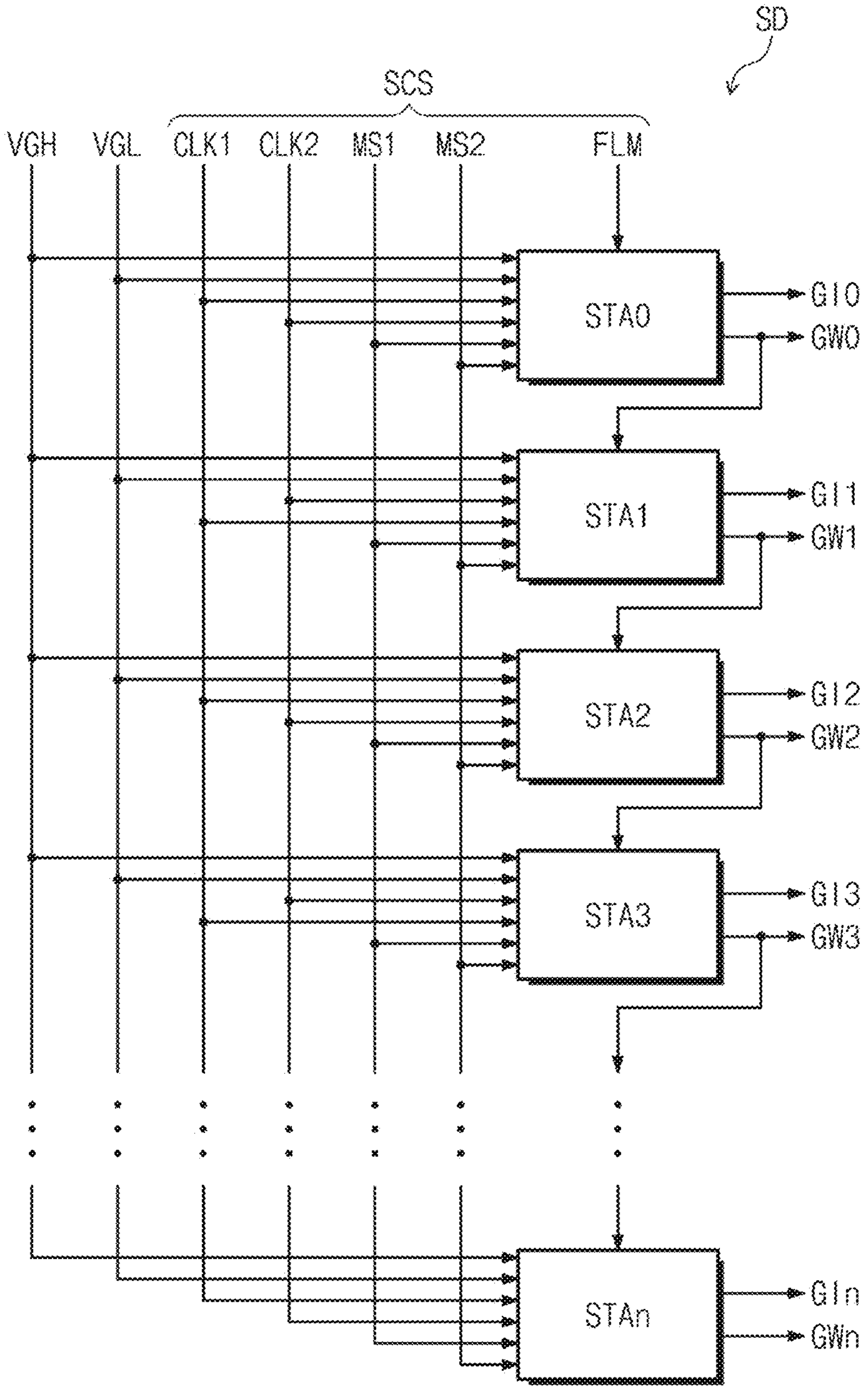
FIG. 16 is a block diagram of an embodiment of a scan driving circuit according to the invention.

FIG. 16 is a block diagram of an embodiment of the scan driving circuit SD according to the invention. The scan driving circuit SD illustrated in FIG. 16 outputs the first scan signals GI0 to GIn, and a second scan signal GW0 and the second scan signals GWI to GWn.

Referring to FIG. 16, the scan driving circuit SD includes driving stages STA0 to STAn.

Each of the driving stages STA0 to STAn receives the scan control signal SCS from the driving controller 100 illustrated in FIG. 4. The scan control signal SCS includes the start signal FLM, the first clock signal CLK1, the second clock signal CLK2, a first masking signal MS1, and a second masking signal MS2. The first masking signal MS1 and the second masking signal MS2 may be signals indicating a driving/non-driving state of the first to third blocks DA2-1, DA2-2, and DA2-3. Each of the driving stages STA0 to STAn receives the first voltage VGL and the second voltage VGH. The first voltage VGL and the second voltage VGH may be provided from the driving controller 100 or the voltage generator 300 illustrated in FIG. 4.

In an embodiment, the driving stages STA0 to STAn output the first scan signals GI0 to GIn and the second scan signals GW0 to GWn. The first scan signals GI0 to GIn are respectively provided to the first scan lines GIL0 to GILn illustrated in FIG. 4. The second scan signals GWI to GWn are respectively provided to the second scan lines GWL1 to GWLn illustrated in FIG. 4.

The second scan signal GWj outputted from a j-th driving stage STAj among the driving stages STA0 to STAn may be provided as a carry signal of a (j+1)-th driving stage STAj+1 subsequent to the j-th driving stage STAj.

Figure 17:
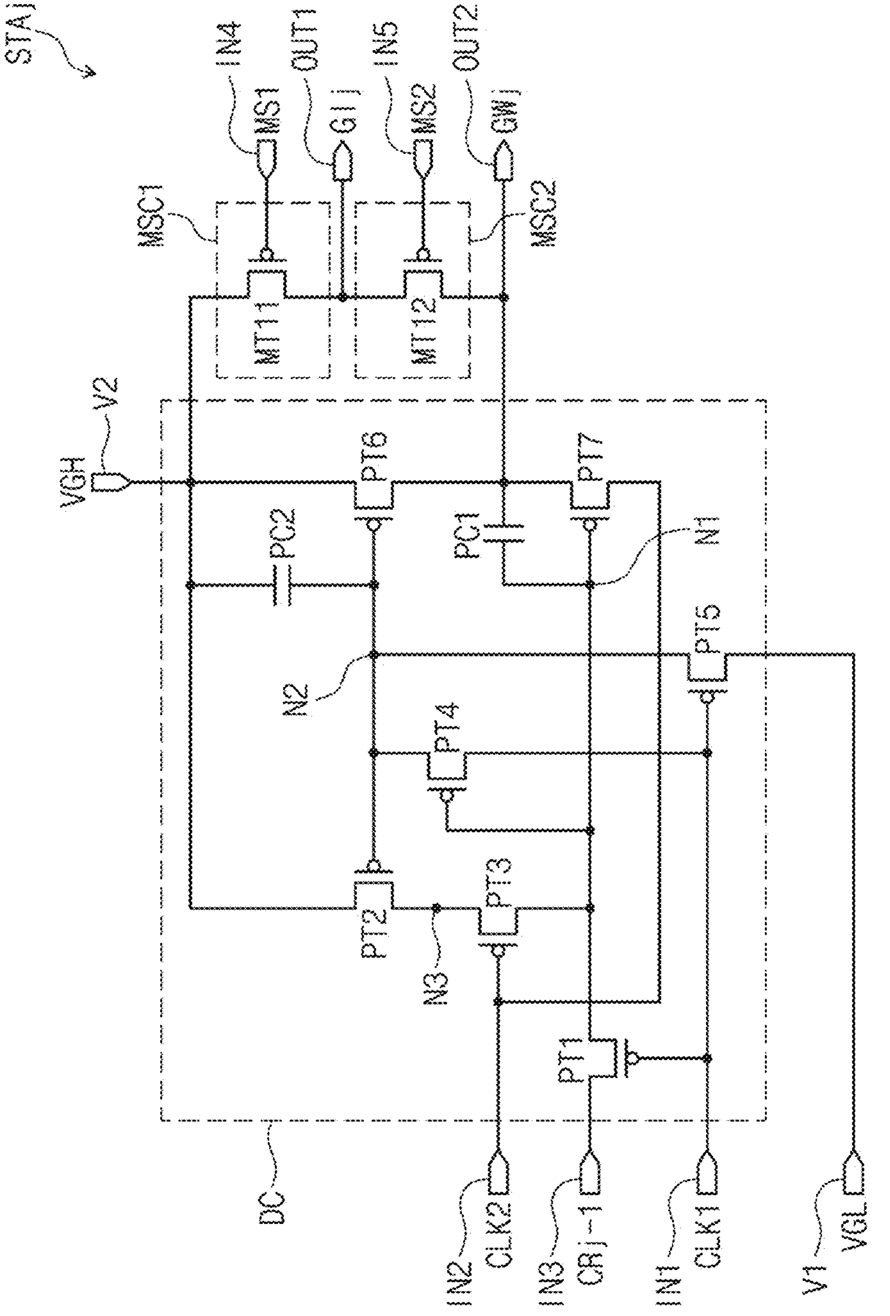
FIG. 17 illustrates a j-th driving stage among the driving stages illustrated in FIG. 16.

FIG. 17 illustrates the j-th driving stage STAj (j is a positive integer) among the driving stages STA0 to STAn illustrated in FIG. 16. Each of the plurality of driving stages STA0 to STAn illustrated in FIG. 16 may include the same circuit configuration as that of the j-th driving stage STAj. Hereinafter, the j-th driving stage STAj is also referred to as a driving stage STAj.

Referring to FIG. 17, the driving stage STAj includes a driving circuit DC, first and second masking circuits MSC1 and MSC2, first to fifth input terminals IN1 to IN5, first and second voltage terminals V1 and V2, and first and second output terminals OUT1 and OUT2. The driving circuit DC includes transistors PT1 to PT7 and capacitors PC1 and PC2, and has the same circuit configuration as and operates similarly to those of the driving circuit DC illustrated in FIG. 8, so that a duplicate description will not be given.

The first masking circuit MSC1 includes a first masking transistor MT11, and the second masking circuit MSC2 includes a second masking transistor MT12. The first masking transistor MT11 may stop (or mask) the output of the first scan signal GIj in response to the first masking signal MS1 inputted from the fourth input terminal IN4. The second masking transistor MT12 may be connected between the first output terminal OUT1 and the second output terminal OUT2 and may stop (or mask) the output of the second scan signal GWj in response to the second masking signal MS2 inputted from the fifth input terminal IN5. The second scan signal GWj outputted from the j-th driving stage STAj may be provided as a carry signal CRj of a (j+1)-th driving stage STAj+1. Similarly, the j-th driving stage STAj receives the second scan signal GWj−1 outputted from a (j−1)-th driving stage STAj−1 through the third input terminal IN3 as a carry signal CRj−1.

Figure 18A:
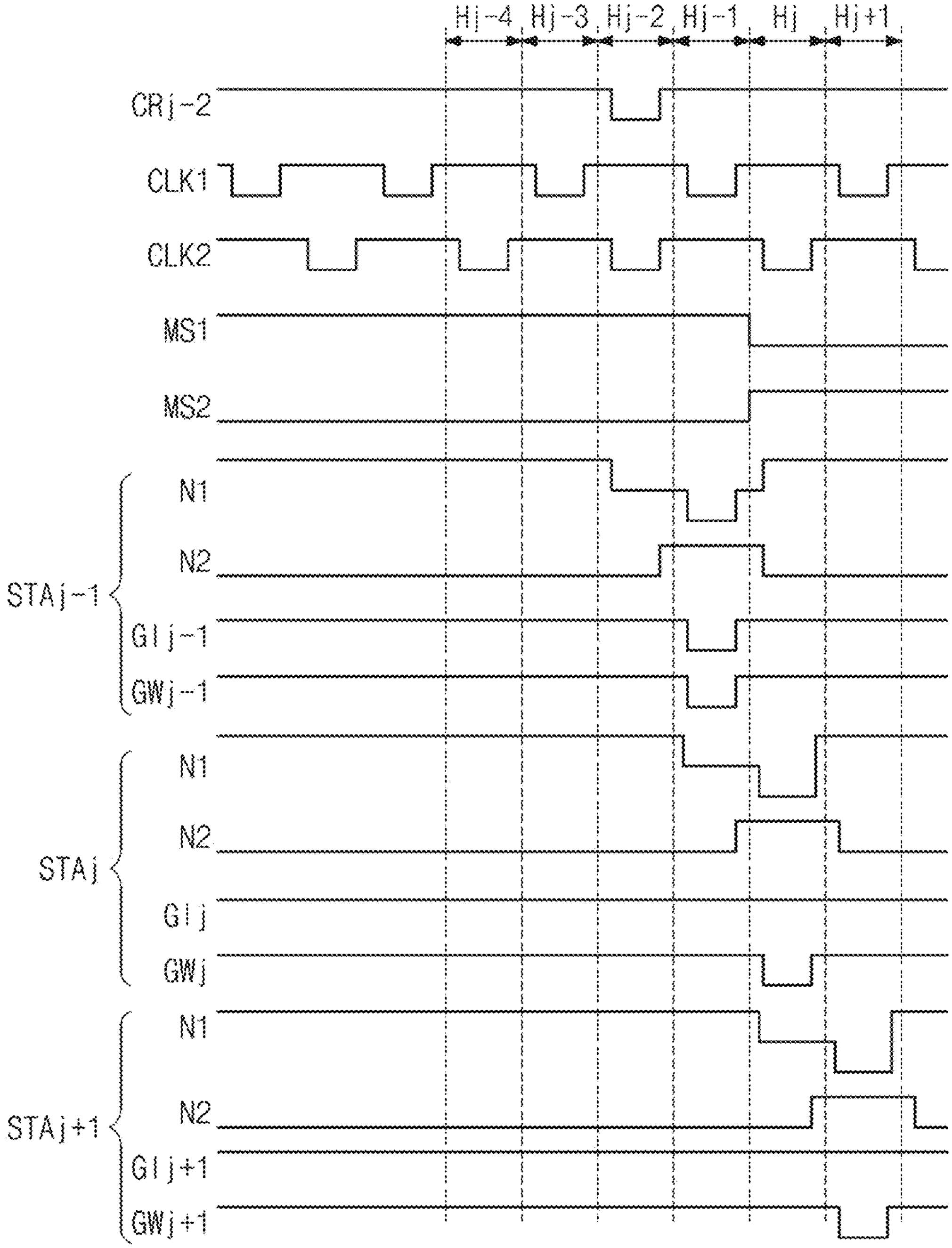
FIG. 18A and FIG. 18B are each a timing diagram illustrating operations of a (j−1)-th driving stage, the j-th driving stage, and a (j+1)-th driving stage in the scan driving circuit illustrated in FIG. 16.
Figure 18B:
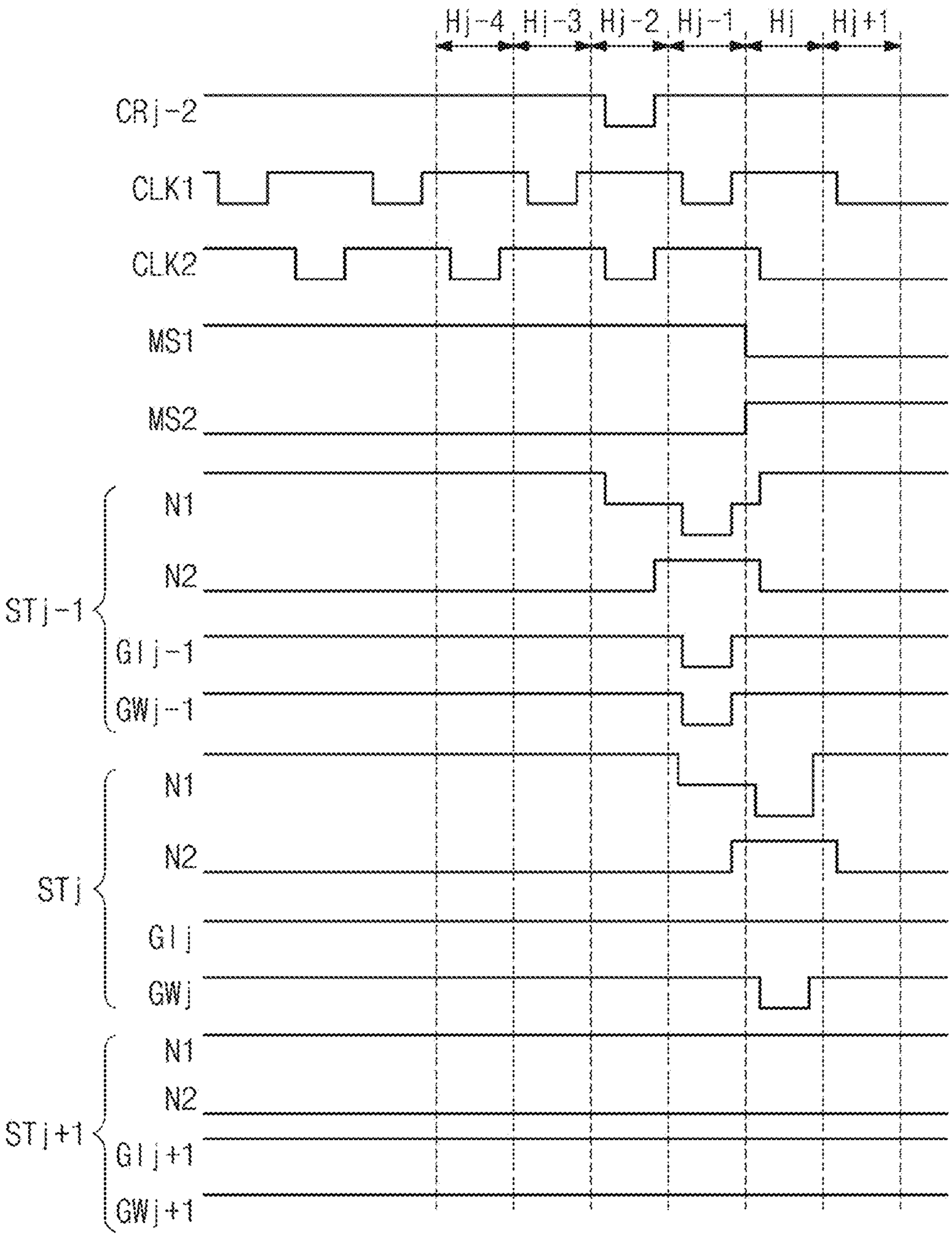

FIG. 18A and FIG. 18B are each a timing diagram illustrating operations of the (j−1)-th driving stage STAj−1, the j-th driving stage STAj, and the (j+1)-th driving stage STAj+1 in the scan driving circuit SD illustrated in FIG. 16.

The operations of the (j−1)-th driving stage STAj−1, the j-th driving stage STAj, and the (j+1)-th driving stage STAj+1 are similar to the operations of the (j−1)-th driving stage STj−1, the j-th driving stage STj, and the (j+1)-th driving stage STj+1 in the scan driver SD1 illustrated in FIG. 9A and FIG. 9B, and thus a duplicate description will not be given.

Referring to FIG. 17 and FIG. 18A, when the first masking signal MS1 transitions from a high level to a low level in a j-th horizontal period Hj, the first masking transistor MT11 is turned on, and thus the first scan signal GIj is maintained at the second voltage VGH, that is, a high level. In addition, when the second masking signal MS2 transitions from the low level to the high level, the second masking transistor MT12 is turned off, so that the electrical connection of the first output terminal OUT1 and the second output terminal OUT2 is cut off. Accordingly, the second scan signal GWj may be determined, regardless of the first scan signal GIj, depending on a voltage level of a connection node of the transistors PT6 and PT7 in the driving circuit DC.

Because the transistor PT6 is turned off, and the transistor PT7 is turned on in the j-th horizontal period Hj, the second scan signal GWj may transition to the low level by the second clock signal CLK2 received through the second input terminal IN2.

Because the first masking signal MS1 is at the low level in a (j+1)-th horizontal period Hj+1, the first scan signal GIj+1 outputted from the (j+1)-th driving stage STAj+1 is maintained at the second voltage VGH, that is, at the high level. The driving circuit DC in the (j+1)-th driving stage STAj+1 may receive the second scan signal GWj from the j-th driving stage STAj as the carry signal CRj and may output a second scan signal GWj+1 of the low level.

FIG. 18B illustrates a method of maintaining the second scan signal GWj+1 as well as the first scan signals GIj and GIj+1 at an inactive state of the high level.

Referring to FIG. 17 and FIG. 18B, in the j-th driving stage STAj, when the first clock signal CLK1 is at the high level in the j-th horizontal period Hj, the transistor PT5 is turned off, and the level of a second node N2 becomes the high level by the transistor PT4 of a turned-on state, so that the transistor PT6 is turned off. When the second clock signal CLK2 received through the second input terminal IN2 is at the low level, the level of a first node N1 is changed to a level lower than the low level of the first node N1 by the capacitor PC1, and the transistor PT7 is turned on, so that the second output terminal OUT2 may output a second scan signal GWj of the low level. At this time, because the first masking transistor MT11 is turned on by the first masking signal MS1 of the low level, the first scan signal GIj outputted to the first output terminal OUT1 is maintained at the high level in the j-th horizontal period Hj.

In the (j+1)-th driving stage STAj+1, the transistor PT5 is turned on by a second clock signal CLK2 of the low level received through the first input terminal IN1 in the (j+1)-th horizontal period Hj+1. The second node N2 is maintained at the low level by the turned-on transistor PT5, and the transistor PT6 is turned on. Accordingly, a second scan signal GWj+1 of the high level may be outputted.

As illustrated in FIG. 18A and FIG. 18B, the first masking signal MS1 and the second masking signal MS2 may mask the output of the first scan signals GIj and GIj+1. Also, when both the first clock signal CLK1 and the second clock signal CLK2 are at the low level, the output of the second scan signal GWj+1 may be masked.

Because the driving stage STAj illustrated in FIG. 17 may selectively mask the second scan signal GWj as well as the first scan signal GIj, the driving stage STAj may operate in the multi-frequency mode MFMb illustrated in FIG. 3C.

When a moving image is displayed in the first display area, and a still image is displayed in the second display area, a display device having the above-described configuration may operate in the multi-frequency mode in which the first display area is driven at the first driving frequency, and the second display area is driven at the second driving frequency. In particular, the display device may drive the second display area at the second driving frequency by dividing the second display area into a plurality of blocks and alternately driving the plurality of blocks. Accordingly, the period of each of the frames becomes constant, and thus it is possible to prevent display quality from being degraded.

Although the embodiments of the invention have been described herein, it is understood that various changes and modifications may be made by those skilled in the art within the spirit and scope of the invention. The embodiments described herein are not intended to limit the technical spirit and scope of the invention, and all technical spirit within the scope of the following claims or the equivalents will be construed as being included in the scope of the invention.

What is claimed is:

1. A display device comprising:

a display panel comprising a plurality of pixels respectively connected to corresponding data lines of a plurality of data lines and respectively connected to corresponding scan lines of a plurality of scan lines;

a data driving circuit which drives the plurality of data lines;

a scan driving circuit which drives the plurality of scan lines in response to clock signals; and a driving controller which:

divides the display panel into a first display area and a second display area;

controls the data driving circuit and the scan driving circuit so that the first display area is driven at a first driving frequency, and the second display area is driven at a second driving frequency lower than the first driving frequency during a multifrequency mode; and divides the second display area into a plurality of blocks and drives a block of the plurality of blocks every frame during the multi-frequency mode, wherein the driving controller controls, in a normal mode, the data driving circuit and the scan driving circuit so that the first display area and the second display area are driven at a normal frequency, the second driving frequency is lower than the normal frequency, and the first driving frequency is higher than the normal frequency, wherein the driving controller controls the data driving circuit and the scan driving circuit so that the first display area and a first block among the plurality of blocks of the second display area are sequentially driven during a first frame of the multi-frequency mode, wherein the driving controller controls the data driving circuit and the scan driving circuit so that the first display area and a second block among the plurality of blocks of the second display area are sequentially driven during a second frame consecutive to the first frame of the multi-frequency mode, wherein the second frame comprises a first period, a delay period consecutive to the first period and a second period consecutive to the delay period, wherein the driving controller provides a first area image signal corresponding to the first display area to the data driving circuit during the first period, wherein the driving controller provides a second block image signal corresponding to the second block to the data driving circuit during the second period, a first clock signal among the clock signals has a first frequency during each of the first period and the second period, and the first clock signal has a second frequency that is higher than the first frequency during the delay period.

2. The display device of claim 1, wherein consecutive frames of the multi-frequency mode have a same duration as each other.

3. The display device of claim 1, wherein the driving controller alternately drives the plurality of blocks of the second display area every frame during the multi-frequency mode.

4. The display device of claim 1, wherein the scan driving circuit comprises a plurality of driving stages, and a driving stage of the plurality of driving stages drives a first scan line among the plurality of scan lines.

5. The display device of claim 4, wherein the driving controller outputs a masking clock signal, and the driving stage of the plurality of driving stages comprises:

a first output terminal connected to the first scan line;

a second output terminal which outputs a carry signal;

a driving circuit which determines a level of a signal of each of a first node and a second node in response to the clock signals and a previous carry signal; and a masking circuit which outputs a first scan signal to the first output terminal in response to the signal of the first node, the signal of the second node, and the masking clock signal, wherein the first node is electrically connected to the second output terminal, and the previous carry signal is the carry signal outputted from a previous driving stage.

6. The display device of claim 5, wherein the masking clock signal indicates a driving/non-driving state of each of the plurality of blocks of the second display area.

7. The display device of claim 5, wherein each of driving stages corresponding to the first block among the plurality of driving stages masks the first scan signal during the second frame.

8. The display device of claim 5, wherein the driving stage of the plurality of driving stages further comprises a first voltage terminal which receives a first voltage and a second voltage terminal which receives a second voltage, wherein the masking circuit comprises:

a first masking transistor which is connected between the second voltage terminal and the first output terminal and includes a gate electrode connected to the second node; and a second masking transistor which is connected between the first output terminal and an input terminal receiving the masking clock signal and includes a gate electrode electrically connected to the first node.

9. The display device of claim 1, wherein the first frame and the second frame have a same duration as each other.

10. The display device of claim 1, wherein the scan driving circuit comprises a plurality of driving stages, and a driving stage of the plurality of driving stages drives a first scan line and a second scan line among the plurality of scan lines.

11. The display device of claim 10, wherein the driving stage of the plurality of driving stages comprises:

a first output terminal connected to the first scan line;

a second output terminal connected to the second scan line;

a driving circuit which outputs a second scan signal to the second output terminal in response to clock signals and a previous carry signal;

a first masking circuit which outputs a first scan signal outputted to the first output terminal at a predetermined level in response to a first masking signal; and a second masking circuit which electrically connect the first output terminal and the second output terminal in response to a second masking signal to output the second scan signal as the first scan signal, wherein the previous carry signal is the second scan signal outputted from a previous driving stage among the plurality of driving stages.

12. The display device of claim 11, wherein the driving controller drives only a first block among the plurality of blocks during a first frame, and wherein the driving controller drives only a second block among the plurality of blocks in a second frame consecutive to the first frame.

13. The display device of claim 12, wherein the first masking signal and the second masking signal indicates a driving/non-driving state of each of the plurality of blocks of the second display area.

14. The display device of claim 13, wherein each of driving stages corresponding to the first block among the plurality of driving stages masks the first scan signal during the second frame.

15. The display device of claim 1, wherein, during the multi-frequency mode, an image signal provided to the first display area is a moving image signal, and an image signal provided to the second display area is a still image signal.

16. A display device comprising:

a display panel including a plurality of pixels respectively connected to corresponding data lines of a plurality of data lines and respectively connected to corresponding scan lines of a plurality of scan lines;

a data driving circuit which drives the plurality of data lines;

a scan driving circuit which drives the plurality of scan lines in response to clock signals; and a driving controller which:

determines an operation mode based on an input signal;

controls the data driving circuit and the scan driving circuit so that, while the operation mode is a multi-frequency mode, a first display area of the display panel is driven at a first driving frequency, and a second display area of the display panel is driven at a second driving frequency;

divides the second display area into a plurality of blocks during the multifrequency mode; and outputs a masking clock signal, wherein the scan driving circuit drives a first portion of the second display area and does not drive a second portion of the second display area in response to the masking clock signal during the multi-frequency mode, wherein the driving controller controls, in a normal mode, the data driving circuit and the scan driving circuit so that the first display area and the second display area are driven at a normal frequency, the second driving frequency is lower than the normal frequency, and the first driving frequency is higher than the normal frequency, wherein the driving controller controls the data driving circuit and the scan driving circuit so that the first display area and a first block among the plurality of blocks of the second display area are sequentially driven during a first frame of the multifrequency mode, wherein the driving controller controls the data driving circuit and the scan driving circuit so that the first display area and a second block among the plurality of blocks of the second display area are sequentially driven during a second frame consecutive to the first frame of the multi-frequency mode, wherein the second frame comprises a first period, a delay period consecutive to the first period and a second period consecutive to the delay period, wherein the driving controller provides a first area image signal corresponding to the first display area to the data driving circuit during the first period, wherein the driving controller provides a second block image signal corresponding to the second block to the data driving circuit during the second period, a first clock signal among the clock signals has a first frequency during each of the first period and the second period, and the first clock signal has a second frequency that is higher than the first frequency during the delay period.

17. The display device of claim 16, wherein a first non-folding area, a folding area, and a second non-folding area are defined in the display panel in a plan view, wherein the first non-folding area corresponds to the first display area, the second non-folding area corresponds to the second display area, and a first portion of the folding area corresponds to the first display area, and a second portion of the folding area corresponds to the second display area.

18. The display device of claim 16, wherein consecutive frames of the multi-frequency mode have a same duration as each other.

19. The display device of claim 16, wherein, during the multi-frequency mode, the driving controller:

outputs the masking clock signal to drive the first block among the plurality of blocks during the first frame; and outputs the masking clock signal to drive the second block among the plurality of blocks during the second frame.

* * * * *